United States Patent
Sita et al.

(10) Patent No.: US 8,188,200 B2
(45) Date of Patent: May 29, 2012

(54) PROCESS FOR PREPARATION OF POLYOLEFINS VIA LIVING COORDINATIVE CHAIN TRANSFER POLYMERIZATION

(75) Inventors: Lawrence R. Sita, Silver Spring, MD (US); Wei Zhang, Gaithersburg, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 12/742,055

(22) PCT Filed: Nov. 10, 2008

(86) PCT No.: PCT/US2008/012619
§ 371 (c)(1),
(2), (4) Date: Oct. 18, 2010

(87) PCT Pub. No.: WO2009/061499
PCT Pub. Date: May 14, 2009

(65) Prior Publication Data
US 2011/0028654 A1  Feb. 3, 2011

Related U.S. Application Data

(60) Provisional application No. 60/986,745, filed on Nov. 9, 2007.

(51) Int. Cl.
C08F 4/642 (2006.01)
C08F 4/643 (2006.01)
C08F 4/6592 (2006.01)
C08F 293/00 (2006.01)

(52) U.S. Cl. ............ 526/161; 526/79; 526/87; 526/133; 526/160; 526/336; 526/339; 526/348; 526/943; 502/103; 502/114; 502/128; 502/152; 525/245; 525/247

(58) Field of Classification Search .................... 526/79, 526/87, 133, 160, 161, 336, 339, 348, 943; 502/103, 114, 128, 152; 525/245, 247
See application file for complete search history.

(56) References Cited

U.S. PATENT DOCUMENTS

| | | | |
|---|---|---|---|
| 5,387,660 A | 2/1995 | Doyle et al. | |
| 5,648,438 A | 7/1997 | Henry et al. | |
| 6,579,998 B2 | 6/2003 | Sita et al. | |
| 7,041,759 B2 | 5/2006 | Sita et al. | |
| 7,053,157 B2 | 5/2006 | Sita et al. | |
| 7,183,364 B2 | 2/2007 | Sita | |
| 7,541,412 B2 | 6/2009 | Sita | |
| 2001/0008927 A1 | 7/2001 | Sato et al. | |
| 2002/0007025 A1 | 1/2002 | Crowther et al. | |
| 2003/0134999 A1 | 7/2003 | Windisch et al. | |
| 2004/0198930 A1 | 10/2004 | Sita et al. | |
| 2004/0241251 A1 | 12/2004 | Thiele et al. | |
| 2009/0209703 A1 | 8/2009 | Sita et al. | |
| 2009/0220786 A1 | 9/2009 | Sita et al. | |

FOREIGN PATENT DOCUMENTS

WO  WO 00/04066 A1  1/2000

OTHER PUBLICATIONS

Kempe, R., "How to Polymerize Ethylene in a Highly Controlled Fashion?," Chem. Eur. J. 13:2764-2773, Wiley-VCH Verlag GmbH & Co., Germany (2007).
Zhang, W. and Sita, L., "Highly Efficient, Living Coordinative Chain-Transfer Polymerization of Propene with ZnEt$_2$: Practical Production of Ultrahigh to Very Low Molecular Weight Amorphous Atatctic Polypropenes of Extremely Narrow Polydisperity," J. Am. Chem. Soc. 130:442-443, American Chemical Society, United States (2008).
Zhang, W., et al., "Living Coordinate Chain-Transfer Polymerization and Copolymerization of Ethene, $\alpha$-Olefins, and $\alpha$,$\omega$-Nonconjugated Dienes using Dialkylzinc as "Surrogate" Chain-Growth Sites," Macromolecules 41:7829-7833, American Chemical Society, United States (2008).
International Search Report for International Application No. PCT/US2008/12619, Alexandria, Virginia, mailed on Jan. 8, 2009.
Supplementary European Search Report for European Patent Application No. EP 08 84 7706.2, European Patent Office, The Hague, Netherlands, dated Mar. 16, 2011.

*Primary Examiner* — Caixia Lu
(74) *Attorney, Agent, or Firm* — Sterne, Kessler, Goldstein & Fox P.L.L.C.

(57) ABSTRACT

Disclosed is a method of producing a polyolefin composition comprising contacting a metallocene pre-catalyst, co-catalyst, and a stoichiometric excess of a metal alkyl; adding a first olefin monomer; and polymerizing the first monomer for a time sufficient to form the polyolefin. The method allows for the use of minimum amounts of activating co-catalyst and metallocene pre-catalyst. Also disclosed is a method of producing a block polyolefin composition comprising contacting a metallocene pre-catalyst, a co-catalyst, and a stoichiometric excess of a metal alkyl; adding a first olefin monomer; polymerizing the first monomer for a time sufficient to form the polyolefin; adding a second monomer; and polymerizing the second olefin monomer for a time sufficient to form said block polyolefin composition. Also disclosed are amorphous atactic polymer and copolymer compositions made according to the present invention.

33 Claims, 14 Drawing Sheets

PROCESS FOR PREPARATION OF POLYOLEFINS VIA LIVING COORDINATIVE CHAIN TRANSFER POLYMERIZATION

CROSS-REFERENCE TO RELATED APPLICATIONS

This application is a nonprovisional of U.S. Provisional Appl. No. 60/986,745, filed Nov. 9, 2007, which is incorporated herein by reference in its entirety.

Part of the work performed during development of this invention utilized U.S. Government funds. The work was partly funded by the National Science Foundation Grant CHE-061794. The U.S. Government has certain rights in this invention.

BACKGROUND OF THE INVENTION

1. Field of the Invention

The present invention provides a method of olefin polymerization that allows for production of monomodal polyolefins of very narrow molecular weight polydispersity and of tunable composition and molecular weight. The olefin polymerization process is further defined as a 'living' polymerization that is mediated by an 'active' transition metal catalyst that serves as the propagating center for chain growth through monomer enchainment. According to prior art, a living polymerization is further defined as one in which there is a requisite limitation of one polymer chain per active propagation. The present invention however removes this limitation by including additional equivalents of a main group metal alkyl that serve as additional 'surrogate' chain growth sites through highly efficient and reversible polymer chain-transfer between the active propagating transition metal center and the surrogate main group metal sites. This new polymerization process is uniquely defined as 'living coordinative chain-transfer polymerization' of olefins and it additionally allows for the first time, scalability of the volume of polyolefins that can be prepared through living polymerization with a dramatic reduction in the amount of transition metal catalyst that is required while not sacrificing all the desired beneficial features of the polymer that can be obtained through a living process, including tunable molecular weights, narrow polydispersities, ability to prepare block copolymers with discrete block junctions, random copolymers, and polyolefins with well-defined and discrete end-group functionalizations.

2. Related Art

Several transition-metal-based catalysts have been reported that can mediate the living metal-mediated coordination polymerization (also known as homogeneous, single-site Ziegler-Natta polymerization) of ethene, propene, higher $\alpha$-olefins, and $\alpha,\omega$-nonconjugated dienes, and, in some cases, these proceed with a high degree of stereocontrol (tacticity) ((for a review of catalysts for living coordination polymerization of ethene and $\alpha$-olefins, see: Coates, G. W., et al., *Angew. Chem. Int. Ed.* 41:2236-2257 (2002)); (for the living and stereoselective coordination polymerization of $\alpha$-olefins and $\alpha,\omega$-non-conjugated dienes, see: Jayaratne, K. C., et al., *J. Am. Chem. Soc.* 122:958-959 (2000)); Jayaratne, K. C., et al., *J. Am. Chem. Soc.* 122:10490-10491 (2000); Keaton, R. J., et al., *J. Am. Chem. Soc.* 123:6197-6198 (2001); Zhang, Y., et al., *Chem. Commun.* 2358-2359 (2003); Zhang, Y., et al., *Organometallics* 23:3512-3520 (2004); Harney, M. B., et al., *Angew. Chem. Int. Ed.* 45:2400-2404 (2006); Harney, M. B., et al., *Angew. Chem. Int. Ed.* 45:6140-6144 (2006); Zhang, W., et al., *Adv. Synth. Catal.* 350:439-447 (2008)). However, the commercialization of new polyolefin materials and products that take advantage of the unique capabilities of living coordination polymerizations appears unlikely ((for reviews of polyolefin materials prepared through living coordination polymerization, see: Domski, G. J., et al., *Prog. Polym. Sci.* 32:30-92 (2007); Sakuma, A., et al., *Polym. J.* 39:193-207 (2007)); Szwarc, M., et al., *Ionic Polymerization and Living Polymers*; Chapman & Hall: New York (1993); Quirk, R. P., et al., *Polym. Int.* 27:359-367 (1992); Matyjaszewski, K., *J. Phys. Org. Chem.* 8:197-207 (1995)).

The same fundamental criterion of a living polymerization, namely, chain-growth propagation in the absence of irreversible chain termination, serves to establish a 'one polymer chain per active metal center' cap on product yield as a critical liability. The severity of this liability sharply increases as the targeted number-average degree of polymerization, $X_n$, of the desired polyolefin product decreases. While living coordination polymerization is ideally suited for accessing the largely unexplored material science and technology associated with architecturally well-structured 'precision polyolefins' of very low to moderate molecular weights (ca 500-10,000 Da), the practical availability of significant quantities of these materials presently remains out of reach due to unfavorable weight (polymer) to weight (catalyst) ratios ((for a review of catalysts for living coordination polymerization of ethene and $\alpha$-olefins, see Coates, G. W., et al., *Angew. Chem. Int. Ed.* 41:2236-2257 (2002)); (for reviews of polyolefin materials prepared through living coordination polymerization, see Domski, G. J., et al., *Prog. Polym. Sci.* 32:30-92 (2007); Sakuma, A., et al., *Polym. J.* 39:193-207 (2007)); Szwarc, M., et al., *Ionic Polymerization and Living Polymers*; Chapman & Hall: New York (1993); Quirk, R. P., et al., *Polym. Int.* 27:359-367 (1992); Matyjaszewski, K., *J. Phys. Org. Chem.* 8:197-207 (1995); Kaneyoshi, H., et al., *Macromolecules* 38:5425-5435 (2005); Ring, J. O., et al., *Macromol. Chem. Phys.* 208:896-902 (2007); Ventola, L., et al., *J. Phys. Chem. Solids* 66:1668-1674 (2005)).

There is a need, therefore, for new methods of coordination polymerization of olefins that allows for scalability of the volume of polyolefins that can be prepared through living polymerization with a dramatic reduction in the amount of transition metal catalyst that is required while not sacrificing all the desired beneficial features of the polymer that can be obtained through a living process, including tunable molecular weights, narrow polydispersities, ability to prepare block copolymers with discrete block junctions, random copolymers, and polyolefins with well-defined and discrete end-group functionalizations.

BRIEF SUMMARY OF THE INVENTION

The present invention provides a method of producing a polyolefin composition comprising contacting a metallocene pre-catalyst, a co-catalyst and a stoichiometric excess of a main group metal alkyl, adding a first olefin monomer; and polymerizing said first monomer for a time sufficient to form said polyolefin.

Alternatively, a stoichiometric excess of a mixture of two or more different main group metal alkyls can be used in place of only one type of main group metal alkyl.

Alternatively, after polymerizing said first monomer for a time sufficient to form a first polyolefin block, adding a second olefin monomer and polymerizing said second monomer for a sufficient time to form a polyolefin block copolymer.

Alternatively, addition of two different monomers in varying ratios, and polymerizing said mixture of monomers for a time sufficient to form a random copolymer.

This polymerization method allows for the use of minimum amounts of activating co-catalyst and metallocene pre-catalyst, and allows for the lower cost of production of large volumes of polyolefins, block copolymers and random copolymers that exhibit all features of having been prepared through a standard living coordination polymerization, including narrow polydispersities, tunable molecular weights, and the ability to incorporate end-group functionalization through termination of the polymerization with a terminating chemical reagent.

DETAILED DESCRIPTION OF THE INVENTION

Figure 1:
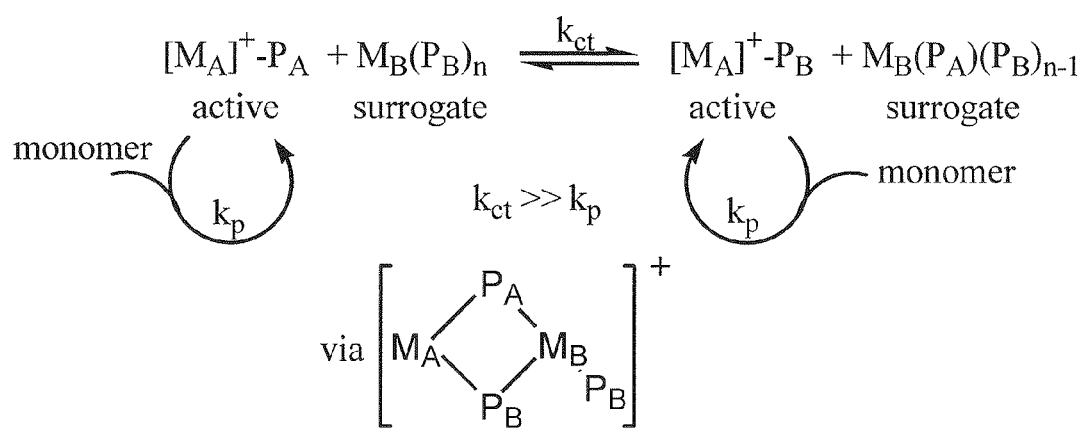
FIG. 1 shows the reversible chain ($P_A$ and $P_B$) transfer between active transition metal propagating centers ($M_A$) and chain-growth inactive main group metal alkyl centers ($M_B$) of the present invention.

"Metallocene" is used here to mean any organometallic coordination complex containing at least one or more σ-bonded or η"-bonded ligands coordinated with a metal atom from Groups IIIB to VIII or the Lanthanide series of the Periodic Table of the Elements. An example of a σ-bonded or η"-bonded ligand is the cyclopentadienyl ring. Examples of the metal atoms are the metals of Group IVB such as titanium, zirconium or hafnium.

A stereoregular macromolecule is understood to be a macromolecule that comprises substantially one species of stereorepeating unit. Examples include, but are not limited to, an isotactic macromolecule, a syndiotactic macromolecule, and an atactic macromolecule. A stereoblock macromolecule is understood to be a block macromolecule composed of at least one or more stereoregular, and possibly, non-stereoregular blocks. An example is isotactic-poly(propylene)-block-atactic-poly(propylene).

An atactic polymer is a regular polymer, the molecules of which have equal numbers of the possible configurational base units in a random sequence distribution. In an atactic polymer, the polymer microstructure will contain stereocenters along the polymer backbone that have random relative configurations.

An amorphous polymer is a polymer in which there is no long-range order amongst different polymer chains that would impart crystallinity to the material.

As used herein, the term "polyolefin" comprises olefin homopolymers, co-polymers and block copolymers.

The term "about" is used herein to mean the given number plus or minus 1 to 10%.

"Living polymerization" is used herein to mean a polymerization process with substantially no chain-growth stopping reactions, such as irreversible chain transfer and chain termination. Living polymerizations allow for control over molecular weights and provide narrow molecular weight distributions. "Dormant species" is used to mean a species that cannot actively engage in propagation through chain enchainment of the monomer until it is converted into an active species through a reversible chemical process, such as a polymer chain coordinated to a neutral metal center. "Active species" is used to mean a species that can engage in propagation through chain enchainment of the monomer, such as a polymer chain coordinated to a cationic metal center. "Surrogate species" is used to define a main group metal alkyl that cannot engage in direct propagation through chain-enchainment of monomer but that can engage in reversible polymer chain transfer with an active or dormant species with a rate of chain-transfer that is at least equal in magnitude to that of the rate of propagation but preferably several times faster.

Monomodal in molecular weight distribution (MWD) is used herein to mean a composition of polymers that comprise one distinct molecular weight distribution. Typically, the MWD is a range of molecular weights that may range in a number average molecular weight ($M_n$) of about 500 Da to about 500,000 kDa. The MWD of a polymer can be measured using any method known to one skilled in the relevant art, for example, size exclusion chromatography and gel permeation chromatography (GPC).

"Polydispersity index" is used herein as a measure of the MWD for a given polymer composition. A polydispersity index of one refers to a monodisperse composition. The polydispersity index is a ratio of weight average molecular weight ($M_w$) to number average molecular weight ($M_n$). In one embodiment, polymer compositions made according the present invention have low polydispersity index, for example, about 1.02-1.15. However, other embodiments of the present invention may have a low polydispersity index that is defined as being within the range of 1.01-1.2. A polydispersity index may also be within the range of 1.2-1.8 and still be classified as having been produced by the present invention if the rate of reversible chain-transfer between active and surrogate species is close in magnitude to the rate of propagation of the active species.

Coordinative chain-transfer polymerization (CCTP) employs added equivalents of a metal alkyl that can serve in the capacity of "surrogate" metal chain-growth sites. CCTP employs highly efficient and reversible chain (polymeryl group, $P_A$ and $P_B$) transfer between active transition metal propagating centers ($M_A$) and chain-growth-inactive main group metal alkyl centers ($M_B$) that proceed according to FIG. 1. If the rate constant for chain-transfer exchange between the active and inactive metal centers, $k_{ct}$, is several times greater than the rate constant for propagation, $k_p$, then both the transition and main group metal centers will effectively appear to engage in chain-growth propagation at the same rate while also maintaining all the desired features of a living polymerization (Hustad, P. D., et al., *Macromolecules* 41:4081-4089 (2008); Muller, A. H. E., et al., *Macromolecules* 28:4326-4333 (1995)). Indeed, under these conditions, $X_n$, will be governed by both the quantity of monomer consumed and the total concentration of all polymeryl groups, $P_A$ and $P_B$, that are formally engaged in active chain growth according to FIG. 1, and more precisely by: $X_n=\{[\text{monomer}]_t-[\text{monomer}]_0\}/([M-P_A)^++(n)(M'-P_B)]_0)$; where n is the number of equivalent polymeryl groups per main group metal (e.g. n=2 for $ZnR_2$). The molecular weight polydispersity index, D ($=M_w/M_n$), will further be approximately determined by the relative magnitudes of the rate constants for these two processes according to: $D\approx1+(k_p/k_{ct})$ (Müller, A. H. E., et al., *Macromolecules* 28:4326-4333 (1995)). Finally, according to the mechanism depicted in FIG. 1, the quantity of polymer product is clearly no longer capped by the amount of transition metal catalyst, but rather, on the total molar equivalents of the much less expensive and readily available main group metal alkyl ($M_B$) that is employed.

Although highly desirable for beating the 'one-chain per metal' restriction of living Ziegler-Natta polymerizations, CCTP has, until now, only been successfully demonstrated in non-living fashion for ethene polymerization and for the 'chain-shuttling' copolymerization of ethene and 1-octene employing two different single-site catalysts for the production of 'blocky' polyolefin copolymers ((for a recent review and references for CCTP of ethene using main group metal alkyls, see: Kempe, R., *Chem. Eur. J.* 13: 2764-2773 (2007); Pelletier, J. F., et al., *Angew. Chem. Int. Ed. Engl.* 35:1854-1856 (1996); Chenal, T., et al., *Polymer* 48:1844-1856 (2007); Britovsek, G. J. P., et al., *Angew. Chem. Int. Ed.* 41:489-491 (2002); Britovsek, G. J. P., et al., *J. Am. Chem. Soc.* 126:10701-10712 (2004); van Meurs, M., et al., *J. Am. Chem. Soc.* 127:9913-9923 (2005); Rogers, J. S., et al., *Chem. Commun.* 1209-1210 (2000); Bazan, G. C., et al., *Organometallics* 20:2059-2064 (2001); Mani, G., et al., *Organometallics* 23:4608-4613 (2004); Mani, G., et al., *Angew. Chem. Int. Ed.* 43:2263-2266 (2004); Ganesan, M., et al., *J. Organomet. Chem.* 690:5145-5149 (2005); Kretschmer, W. P., et al., *Chem. Eur. J.* 12:8969-8978 (2006)); (for a 'chain-shuttling' process based on the concept of CCTP with two different catalysts and diethyl zinc ($ZnEt_2$) for the copolymerization of ethene/1-octene that produces 'blocky' poly(ethene-co-1-octene), see: Arriola, D. J., et al., *Science* 312:714-719 (2006); Hustad, P. D., et al., *Macromolecules* 40:7061-7064 (2007); Hustad, P. D., *Macromolecules* 41:4081-4089 (2008))).

For successful realization of CCTP under living or non-living conditions, it has already been convincingly demonstrated that substantial difficulties exist in identifying the right combinations of pre-catalyst, co-catalyst, main group metal alkyl chain-transfer agent, and polymerization conditions under which rapid, reversible, and highly efficient chain-transfer (including chain-shuttling between two different active propagating centers) can occur according to FIG. 1 (van Meurs, M., et al., *J. Am. Chem. Soc.* 127:9913-9923 (2005); Alfano, F., et al., *Macromolecules* 40:7736-7738 (2007)).

Living coordinative chain transfer polymerization can be considered as degenerative chain-transfer coordination polymerization, which is mechanistically distinct from a living degenerative group transfer coordination polymerization process. (Zhang, Y., et al., *J. Am. Chem. Soc.* 125:9062-9069 (2003); Zhang, Y., et al., *J. Am. Chem. Soc.* 126:7776-7777 (2004); Harney, M. B., et al., *Angew. Chem. Int. Ed.* 45:2400-2404 (2006); Harney, M. B., et al., *Angew. Chem. Int. Ed.* 45:6140-6144 (2006)).

The present invention provides a method of producing a polyolefin composition comprising contacting a metallocene pre-catalyst, a co-catalyst and a stoichiometric excess of a main group metal alkyl, adding a first olefin monomer; and polymerizing said first monomer for a time sufficient to form said polyolefin.

Alternatively, a stoichiometric excess of a mixture of two or more different main group metal alkyls can be used in place of only one type of main group metal alkyl.

Alternatively, after polymerizing said first monomer for a time sufficient to form a first polyolefin block, adding a second olefin monomer and polymerizing said second monomer for a sufficient time to form a polyolefin block copolymer.

Alternatively, addition of two different monomers in varying ratios, and polymerizing said mixture of monomers for a time sufficient to form a random copolymer.

This polymerization method allows for the use of minimum amounts of activating co-catalyst and metallocene pre-catalyst, and allows for the lower cost of production of large volumes of polyolefins, block copolymers and random copolymers that exhibit all features of having been prepared through a standard living coordination polymerization, including narrow polydispersities, tunable molecular weights, and the ability to incorporate end-group functionalization through termination of the polymerization with a terminating chemical reagent.

The present invention also provides a method of producing a block polyolefin composition. The method comprises contacting a metallocene pre-catalyst, a co-catalyst, and a stoichiometric excess of a metal alkyl in a solvent; adding a first olefin monomer; polymerizing said first monomer for a time sufficient to form a polyolefin; adding a second olefin monomer; and polymerizing said second olefin monomer to form said block polyolefin composition.

Metallocene catalysts for use in the present invention include any metallocene pre-catalyst that initiates the polymerization of an olefin monomer. Specific examples include, but are not limited to single-site metallocene pre-catalyst such as those disclosed in Hlatky, et al., *J. Am. Chem. Soc.* 111:2728-2729 (1989); K. C. Jayaratne, et al., *J. Am. Chem. Soc.* 122:958-959 (2000); K. C. Jayaratne, et al., *J. Am. Chem. Soc.* 122:10490-10491 (2000); R. J. Keaton, et al., *J. Am. Chem. Soc.* 122:12909-12910 (2000) and R. J. Keaton, et al., *J. Am. Chem. Soc.* 123:6197-6198 (2001).

Illustrative but non-limiting examples of metallocene pre-catalysts for use in the present invention include dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconiumdibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as pentamethylcyclopentadienyl titanium trichloride, pentaethylcyclopentadienyl titanium trichloride, bis(pentamethylcyclopentadienyl)titanium diphenyl; the carbene represented by the formula bis(cyclopentadienyl)titanium=CH2 and derivatives of this reagent; substituted bis(cyclopentadienyl)titanium (IV) compounds such as bis(indenyl)titanium diphenyl or dichloride, bis(methylcyclopentadienyl)titanium diphenyl or dihalides; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like, as well as isopropyl(cyclopentadienyl)(fluorenyl)zirconium dichloride, isopropyl(cyclopentadienyl)(octahydrofluorenyl)zirconium dichloride, diphenylmethylene(cyclopentadienyl)(fluorenyl)zirconium dichloride, diisopropylmethylene(cyclopentadienyl)(fluorenyl)zirconium dichloride, diisobutylmethylene(cyclopentadienyl)(fluorenyl)zirconium dichloride, ditertbutylmethylene(cyclopentadienyl)(fluorenyl)zirconium dichloride, cyclohexylidene(cyclopentadienyl)(fluorenyl)zirconium dichloride, diisopropylmethylene (2,5-dimethylcyclopentadienyl)(fluorenyl)zirconium dichloride, isopropyl(cyclopentadienyl)(fluorenyl)hafnium dichloride, diphenylmethylene(cyclopentadienyl)(fluorenyl)hafnium dichloride, diisopropylmethylene(cyclopentadienyl)(fluorenyl)hafnium dichloride, diisobutylmethylene(cyclopentadienyl)(fluorenyl)hafnium dichloride, ditertbutylmethylene(cyclopentadienyl)(fluorenyl)hafnium dichloride, cyclohexylidene(cyclopentadienyl)(fluorenyl)hafnium dichloride, diisopropylmethylene (2,5-dimethylcyclopentadienyl)(fluorenyl)hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl)(fluorenyl)titanium dichloride, diisobutylmethylene(cyclopentadienyl)(fluorenyl)titanium dichloride, ditertbutylmethylene(cyclopentadienyl)(fluorenyl)titanium dichloride, cyclohexylidene(cyclopentadienyl)(fluorenyl)titanium dichloride, diisopropylmethylene (2,5-dimethylcyclopentadienyl)(fluorenyl)titanium dichloride, racemic-ethylene bis(1-indenyl)zirconium (IV) dichloride, racemic-ethylene bis(4,5,6,7-tetrahydro-1-indenyl)zirconium (IV) dichloride, racemic-dimethylsilyl bis(1-indenyl)zirconium (IV) dichloride, racemic-dimethylsilyl bis(4,5,6,7-tetrahydro-1-indenyl)zirconium (IV) dichloride, racemic-1,1,2,2-tetramethylsilanylene bis(1-indenyl)zirconium (IV) dichloride, racemic-1,1,2,2-tetramethylsilanylene bis(4,5,6,7-tetrahydro-1-indenyl)zirconium (IV), dichloride, ethylidene (1-indenyl-tetramethylcyclopentadienyl)zirconium (IV) dichloride, racemic-dimethylsilyl bis(2-methyl-4-t-butyl-1-cyclopentadienyl)zirconium (IV) dichloride, racemic-ethylene bis(1-indenyl)hafnium (IV) dichloride, racemic-ethylene bis(4,5,6,7-tetrahydro-1-indenyl)hafnium (IV) dichloride, racemic-dimethylsilyl bis(1-indenyl)hafnium (IV) dichloride, racemic-dimethylsilyl bis(4,5,6,7-tetrahydro-1-indenyl)hafnium (IV) dichloride, racemic-1,1,2,2-tetramethylsilanylene bis(1-indenyl)hafnium (IV) dichloride, racemic-1,1,2,2-tetramethylsilanylene bis(4,5,6,7-tetrahydro-1 indenyl)hafnium (IV), dichloride, ethylidene (1-indenyl-2,3,4,5-tetramethyl-1-cyclopentadienyl)hafnium (IV) dichloride, racemic-ethylene bis(1-indenyl)titanium (IV) dichloride, racemic-ethylene bis(4,5,6,7-tetrahydro-1-indenyl)titanium (IV) dichloride, racemic-dimethylsilyl bis(1-indenyl)titanium (IV) dichloride, racemic-dimethylsilyl bis(4,5,6,7-tetrahydro-1-indenyl)titanium (IV) dichloride, racemic-1,1,2,2-tetramethylsilanylene bis(1-indenyl)titanium (IV) dichloride racemic-1,1,2,2-tetramethylsilanylene bis(4,5,6,7-tetrahydro-1-indenyl)titanium (IV) dichloride, and ethylidene (1-indenyl-2,3,4,5-tetramethyl-1-cyclopentadienyl)titanium (IV) dichloride, (N-tert-butylamido)(dimethyl)(tetramethyl-$\eta^5$-cyclopentadienyl)silane scandium hydride triphenylphosphine dimer, (N-tert-butylamido)(dimethyl)(tetramethyl-$\eta^5$-cyclopentadienyl)silane scandium hydride, (2,5-dimethyltetrahydrofuran)(N-tert-butylamido)(dimethyl)(tetramethyl-$\eta^5$-cyclopentadienyl)silane scandium bis(trimethylsilyl)methyl, (N-phenyl amido)(dimethyl)(tetramethyl-$\eta^5$-cyclopentadienyl)silane scandium bis(trimethyl)methyl, (N-secbutylamido)(dimethyl)(tetramethyl-$\eta^5$-cyclopentadienyl)silane scandium bis(trimethylsilyl)methyl, (N-tert-butyl amido)(dimethyl)(tetramethyl-$\eta^5$-cyclopentadienyl)silane scandium methyltribenzylphosphine, (N-tert-butylamido)(dimethyl)(tetramethyl-$\eta^5$-cyclopentadienyl)silane scandium methyl, (2,5-dimethyltetrahydrofuran)(N-tert-butylamido)(dimethyl)(tetramethyl-$\eta^5$-cyclopentadienyl)silane scandium benzyl triphenylphosphine, (N-tert-butylamido)(dimethyl)(fluorenyl)silane scandium hydride triphenylphisphine, (N-sec-dodecylamido)(dimethyl)(fluorenyl)silane scandium hydride, (2,5-dimethyltetrahydrofuran)(N-butylamido)(dimethyl)(tetramethyl-$\eta^5$-cyclopentadienyl)silane scandium bis(trimethylsilyl)methyl, (N-tert-butylphospho)(dimethyl)(tetramethyl-$\eta^5$-cyclopentadienyl)silane scandium bis(trimethyl-$\eta^5$-cyclopentadienyl)silane scandium bis(trimethylsilyl)methyl, (N-tert-butylamido)(dimethyl)(octahydrofluorenyl)silane scandium methyltriphenylphosphine, (N-tert-butylamido)(dimethyl)(indenyl)silane scandium methyl (2,5-dimethyltetrahydrofuran, and (N-tert-butylamido)(dimethyl)(tetrahydroindenyl)silane scandium 2-(N,N-dimethylamino)dibenzyl triphenylphosphine.

In one embodiment, the metallocene pre-catalyst for use in the present invention has the formula:

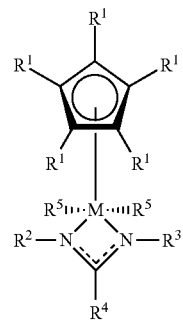

wherein the dotted lines indicate a delocalized bond;
M is Ti, Zr, Hf, V, Nb or Ta;
each $R^1$ is independently hydrogen or alkyl or two adjacent $R^1$ form an aromatic ring;

each $R^2$, $R^3$ and $R^4$ is independently alkyl, cycloalkyl, Si(alkyl)$_3$, Si(aryl)$_3$, phenyl, optionally substituted phenyl, alkylphenyl; and each $R^5$ is halo, alkyl, cycloalkyl, aryl, or arylalkyl.

As used herein, "alkyl" refers to straight- or branched-chain hydrocarbons having from 1 to 10 carbon atoms and more preferably 1 to 8 carbon atoms, including by way of example methyl, ethyl, propyl, iso-propyl, iso-butyl and t-butyl.

"Aryl" by itself or as part of another group refers to monocyclic, bicyclic or tricyclic aromatic groups containing 6 to 14 carbon atoms in the ring position. Useful aryl groups include $C_{6-14}$ aryl, preferably $C_{6-10}$ aryl. Typical $C_{6-14}$ aryl groups include phenyl, naphthyl, indenyl, phenanthrenyl, anthracenyl, fluorenyl and biphenyl groups.

"Arylalkyl" refers to an alkyl group mentioned above substituted by a single aryl group including, by way of example, benzyl, phenethyl and naphthylmethyl.

"Alkylarylalkyl" refers to an alkyl group mentioned above substituted by a single aryl group, wherein the aryl group is further substituted by one or more alkyl groups. Examples include, without limitation, 4-methylbenzyl and 4-ethylphenethyl.

"Cycloalkyl" refers to cyclic alkyl groups containing between 3 and 8 carbon atoms having a single cyclic ring including, by way of example, cyclopropyl, cyclobutyl, cyclopentyl, cyclooctyl and the like.

"Optionally substituted phenyl" refers to a phenyl ring which may contain 1 to 5 electron donating or electron withdrawing groups. By way of example, electron-donating groups include, but are not limited to amino, hydroxy, alkoxy, amide, aryl and alkyl. Examples of electron withdrawing groups include, but are not limited to, halo, ketone, ester, —SO$_3$H, aldehyde, carboxylic acid, cyano, nitro and ammonium.

"Alkylphenyl" refers to an alkyl group mentioned above substituted by a single phenyl group including, by way of example, benzyl, 1-phenethyl, 1-phenylpropyl, 1-phenylbutyl, 2-phenethyl, 2-phenylpropyl, 2-phenylbutyl, 3-phenylpropyl and 3-phenylbutyl.

"Halo" refers to fluoro, chloro, bromo and iodo.

"Aromatic ring" refers to an unsaturated carbocyclic group of 6 to 14 carbon atoms having a single ring (e.g., phenyl) or multiple condensed rings (e.g., naphthyl or anthryl). The metallocene catalysts of the present invention can be prepared using any suitable method known to one skilled in the relevant art. The method of synthesis of the metallocene catalysts is not critical to the invention.

An example of a metallocene catalyst for use in the present invention is CP*Hf(Me)$_2$[N(Et)C(Me)N(Et)] (CP*=$\eta^5$-C$_5$Me$_5$).

The co-catalyst is capable of activating the metallocene pre-catalyst. Preferably, the co-catalyst is one of the following: (a) ionic salts of the general formula [A$^+$][$^-$BR$^6_4$], wherein A$^+$ is Si(R$^7$)$_3$, a cationic Lewis acid or a cationic Brønsted acid, B is the element boron, $R^6$ is phenyl or an optionally substituted phenyl or (b) a boron alkyl of the general formula BR$^6_3$ and each $R^7$ is independently selected from alkyl and optionally substituted phenyl. Examples of Lewis or Brønsted acids that may be used in the practice of the invention include, but are not limited to tetra-n-butylammonium, triphenylcarbonium and dimethylanilinium cations.

Examples of co-catalysts for use in the present invention include, but are not limited to, [PhNMe$_2$H][B(C$_6$F$_5$)$_4$], [Ph$_3$C][B(C$_6$F$_5$)$_4$], and B(C$_6$F$_5$)$_3$.

The metal alkyl is capable of activating reversible chain transfer with active transition metal-based propagating centers. Examples of metal alkyls that may be used in the practice of this invention include main group metal alkyls such as Zn(R$^8$)$_2$ and Al(R$^8$)$_3$, wherein $R^8$ is an alkyl. Mixtures comprised of two or more metal alkyls may also be used in the practice of this invention.

Examples of metal alkyls for use in the present invention include ZnMe$_2$, ZnEt$_2$, Zn(n-butyl)$_2$, Zn(isoamyl)$_2$, Zn(t-butyl)$_2$, Zn(neopentyl)$_2$, Zn(n-propyl)$_2$, Zn(iso-propyl)$_2$, AlEt$_3$, AlMe$_3$, Al(iso-butyl)$_3$, Al(n-hexyl)$_3$, Al(t-butyl)$_3$.

In an embodiment of the present invention, the metal alkyl is ZnEt$_2$. In another embodiment of the present invention, the metal alkyl is Zn(iso-propyl)$_2$. In one embodiment of the present invention, a 1:1 mixture of AlEt$_3$ and ZnEt$_2$ is used.

The method of the present invention comprises contacting a metallocene pre-catalyst, a co-catalyst, and a stoichiometric excess of a metal alkyl. "Stoichiometric excess" is used herein to mean an amount more than an equivalent amount of the metallocene pre-catalyst and/or the co-catalyst. For example, the metal alkyl and metallocene pre-catalyst can be added together in a ratio of metal alkyl:metallocene pre-catalyst in the range of about 1.1:1 to about 5000:1. In an alternative example, the ratio is about 1.2:1, 1.5:1, 1.8:1, 2:1, 2.2:1, 2.5:1, 3:1, 4:1, 5:1, 10:1, 25:1, 50:1, 75:1, 100:1 or 200:1.

In an embodiment of the present invention, the metallocene pre-catalyst and metal alkyl are added together in a ratio of metal alkyl:metallocene pre-catalyst of 5:1, 10:1, 20:1, 50:1, 100:1 or 200:1.

The method of the present invention comprises contacting a metallocene pre-catalyst, a co-catalyst, and a stoichiometric excess of a metal alkyl. For example, the metallocene pre-catalyst and co-catalyst can be added together in a ratio of metallocene pre-catalyst:co-catalyst in the range of about 1:1 to about 100:1. In an alternative example, the ratio is about 1.2:1, 1.5:1, 1.8:1, 2:1, 2.2:1, 2.5:1, 3:1, 4:1, 5:1, 10:1, 25:1, 50:1, 75:1 or 90:1.

In an embodiment of the present invention, the metallocene pre-catalyst and co-catalyst are added together with the metal alkyl in a ratio of metallocene pre-catalyst:co-catalyst in a ratio of 1:1.

In another embodiment of the present invention, the metallocene pre-catalyst, co-catalyst, and metal alkyl are added together in ratio of metal alkyl:metallocene pre-catalyst:co-catalyst of 5:1:1, 10:1:1, 20:1:1, 50:1:1, 100:1:1 or 200:1:1.

The pre-catalyst, co-catalyst, and metal alkyl can be contacted at the same time. Alternatively, the pre-catalyst and co-catalyst can be contacted to form a first catalyst composition which is then contacted with a metal alkyl.

The pre-catalyst, co-catalyst, and metal alkyl can be contacted neat, or in some suitable solvent. Suitable solvents for use in the present invention include inert liquid hydrocarbons that are nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose include, but are not limited to, chlorobenzene, dichlorobenzene, isopentane, hexane, cyclohexane, heptane, benzene, toluene, trifluorotoluene, pentane, octane, isooctane, dichloromethane.

The pre-catalyst, co-catalyst, and metal alkyl can be contacted at any temperature, preferably, the temperature results in the formation of an active catalyst composition for olefin polymerizations. For example, the temperature of the activation reaction is from about −25° C. to about 40° C. or from about −10° C. to about 80° C.

The pre-catalyst, co-catalyst, and metal alkyl can be contacted for any length of time, as long as the activation reaction results in an active catalyst composition for olefin polymerizations. For example, the activation reaction can be performed for a time of about 1 minute to about 50 hours or about 30 minutes to about 5 hours. Alternatively, monomer may be added immediately following the contacting of the metal alkyl, metallocene pre-catalyst, and borate co-catalyst.

Olefin monomers for use in the invention include, but are not limited to, ethene, propene, 1-butene, 1-pentene, 1-hexene, 1-heptene, 1-octene, styrene, alpha-methyl styrene, butadiene, isoprene, acrylonitrile, methyl acrylate, methyl methacrylate, vinyl acetate, vinyl chloride, vinyl fluoride, vinylidene chloride, N-vinyl pyrrolidone, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, 4-methyl-1-pentene or cyclic olefins such as cyclobutene, cyclopentene, cyclohexene, cyclooctene, and alkyl or aryl-substituted cyclic olefins. Olefin monomers for use also include conjugated or non-conjugated dienes, such as linear, branched, or cyclic hydrocarbon dienes having from about 4 to about 20, preferably 4 to 12, carbon atoms, including those dienes having the formula:

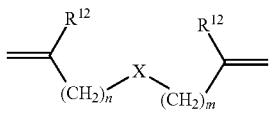

wherein X=CH$_2$, CO, N(R$^{13}$), O or S;
R$^{11}$, R$^{12}$ and R$^{13}$ are each indepedently H, alkyl or phenyl; and
n and m are each independently an integer from 0-5.

Dienes include 1,4-pentadiene, 1,5-hexadiene, 5-vinyl-2-norbornene, 1,7-octadiene, vinylcyclohexene, dicyclopentadiene, butadiene, isobutylene, isoprene and ethylidene norbornene.

In an embodiment of the present invention, the first olefin monomer is propene.

The time required for forming the polyolefin varies depending on the olefin monomer, temperature of reaction, reactant cocentrations, and other conditions, and can be for any length of time, as long as a polymer is formed. For example, the polymerization of the first olefin can be performed for a time of about 1 minute to about 50 hours or about 30 minutes to about 5 hours.

The second olefin monomer can be any polymerizable olefin or diene and it can be added at the same time as the first monomer in which case a random polyolefin copolymer will be obtained. Alternatively, the second olefin can be added after sufficient time for the first monomer to be polymerized in which case a block polyolefin copolymer will be obtained. The ratio of first monomer to second monomer can be, but is not limited to, the range of 1:100 to 100:1. In one example, the first olefin is ethene and the second olefin is 1-octene.

In specific examples, the cationic hafnium acetamidinates, {Cp*Hf(Me)[N(Et)C(Me)N(Et)]}[B(C$_6$F$_5$)$_4$] (CP*=η$^5$-C$_5$Me$_5$) (1a) and {Cp*Hf(Me)[N(Et)C(Me)N(Et)]}[B(C$_6$F$_5$)$_3$ Me] (CP*=η$^5$-C$_5$Me$_5$) (1b) are prepared through demethylation of neutral Cp*Hf(Me)$_2$[N(Et)C(Me)N(Et)] (1) with [PhNMe$_2$H][B(C$_6$F$_5$)$_4$] (2) and B(C$_6$F$_5$)$_3$ (3), respectively, and can serve as highly active initiators for the living coordination polymerization of olefins.

In an embodiment, polymerization methods of the present invention are flexible and allow for the manufacture of polyolefin compositions having various molecular weights. The molecular weights that are given, therefore, are not meant to be limiting. For example, polyolefin compositions of the present invention have number average molecular weight ($M_n$) greater that about 1,000. More particularly, the polyolefin compositions have number average molecular weight of about 1,000 to about 111,000. Methods of determining number average molecular weight of polyolefin compositions are well known to one of ordinary skill in the art. For example, gel permeation chromatography (GPC) may be used.

Polymer compositions made according to the present invention have low polydispersity index, for example, about 1.02-1.15. However, other embodiments of the present invention may have a low polydispersity index that is defined as being within the range of 1.01-1.2. A polydispersity index may also be within the range of 1.2-1.8 and still be classified as having been produced by the present invention if the rate of reversible chain-transfer between active and surrogate species is close in magnitude to the rate of propagation of the active species.

Having now generally described this invention, the same will be understood by reference to the following examples which are provided herein for purposes of illustration only and are not intended to be limiting unless otherwise specified.

EXAMPLES

All manipulations were performed under an inert atmosphere of dinitrogen using either standard Schlenk techniques or a Vacuum Atmospheres glovebox. Dry, oxygen-free solvents were employed throughout. Diethyl ether and pentane were distilled from sodium/benzophenone (with a few milliliters of triglyme being added to the pot in the case of pentane) while toluene was distilled from sodium and chlorobenzene from calcium hydride. Benzene-d$_6$ was vacuum transferred from NaK prior to use for NMR spectroscopy. Polymer grade propene was purchased from Matheson Trigas, and passed through activated Q5 and molecular sieves (4 Å). (η$^5$-C$_5$Me$_5$)HfCl$_3$ was obtained from Strem Inc while [PhNHMe$_2$][B(C$_6$F$_5$)$_4$] (2) was purchased from Boulder Scientific and used without further purification.

Gel permeation chromatography (GPC) analyses were performed using a Viscotek GPC system equipped with a column oven and differential refractometer both maintained at 45° C. and four columns also maintained at 45° C. Tetrahydrofuran was used as the eluant at a flow rate of 1.0 mL/min. $M_n$, $M_w$ and $M_w/M_n$ values were obtained using a Viscotek GPC with OmniSEC software and ten polystyrene standards ($M_n$=580 Da to 3,150 kDa) (Polymer Laboratories). $^1$H NMR spectra were recorded at 400 MHz and ambient temperature while $^{13}$C {$^1$H} NMR spectra were recorded at 125 MHz, using 1,1,2,2-tetrachloroethane-d$_2$ as the solvent at 70° C.

Example 1

Preparation of (η$^5$-C$_5$Me$_5$)*Hf(Me)$_2$[N(Et)C(Me)N(Et)] (1).

To a solution of (η$^5$-C$_5$Me$_5$)HfCl$_3$ (1.26 g, 3.0 mmol) in 120 mL Et$_2$O at −60° C. was added 5.8 mL of a solution of MeLi (1.7 M in Et$_2$O) via syringe over a period of 10 min. The mixture was allowed to warm to −10° C. over a period of 3 hours whereupon the any remaining MeLi was quenched with the addition of 0.30 mL of Me$_3$SiCl at −30° C. via syringe. At this time, a solution of diethyl carbodiimide (0.29 g, 3.0 mmol) in 10 mL of Et$_2$O was added via cannula at −30° C.

over a period of 45 min. The mixture was then allowed to warm to −10° C. over a period of 1.5 hours whereupon the volatiles were removed in vacuo. The resulting white residue was extracted with pentane and filtered through a small pad of Celite in a glass fit. The pentane filtrate was concentrated and cooled to −25° C. whereupon the final product was isolated as a white crystalline material (0.92 g, 67% yield). The solid-state molecular structure of the product was confirmed by single-crystal X-ray analysis.

$^1$H NMR (400 MHz, $C_6D_6$, 293 K): δ 2.96 (q, 4H, J=7.2 Hz), 2.03 (s, 15H), 1.33 (s, 3H), 0.90 (t, 6H, J=7.2 Hz), 0.00 (s, 6H).

Anal. Calcd. for $C_{18}H_{34}N_2Hf$: % C 47.31; % H 7.50; % N 6.13. Found % C 47.21; % H 7.43; % N 6.29.

Example 2

Polymerization of propene in chlorobenzene.

To a solution of 1 (4.6 mg, 10 μmol) in 0.5 mL chlorobenzene at −10° C. was added the co-catalyst 2 (8.0 mg, 10 μmol) in 0.5 mL chlorobenzene. This solution was then rapidly added to a 250-mL Schlenk flask charged with 9.0 mL of chlorobenzene at −10° C., which was previously pressurized to 5 psi with propene and stirred for at least 10 minutes. The flask was then repressurized and the pressure maintained at 5 psi for 30 min with stirring, whereupon the polymerization was quenched with the addition of 0.5 mL of methanol. The reaction mixture was then precipitated into 800 mL acidic methanol to isolate the polymer product. The final polypropene was collected and dried in vacuo. Yield: 1.04 g. GPC: $M_w$=154,000; $M_n$=137,000; PDI=1.12.

Characterization of amorphous atactic polypropene (aa-PP).

Figure 3:
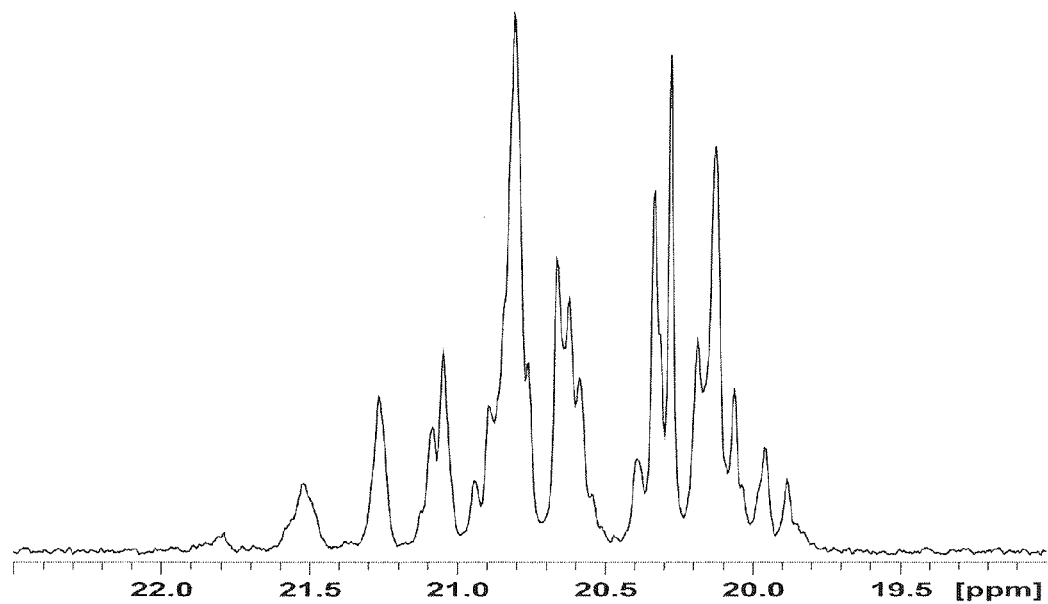
FIG. 3 is a partial $^{13}C$ {$^1H$} NMR spectrum for amorphous atactic polypropene prepared in accordance with an embodiment of the present invention.

The stereochemical microstructure of PP material was analyzed by $^{13}C$ {$^1H$} NMR spectroscopy (125 MHz, using 1,1,2,2-tetrachloroethane-$d_2$, 70° C.) and the spectra obtained are representative for those of all the aa-PP samples prepared. FIG. 3 presents the partial $^{13}C$ {$^1H$} NMR spectrum for the methyl region of this material which is atactic, or at best, slightly syndiotactic rich (cf. mm %=9.5%; mr %=49.2%; rn %=41.3%).

Example 3

Synthesis of ultra-high molecular weight polypropene.

The polymerization was conducted under conditions similar to Example 2 except 100 mL of chlorobenzene was used and the reaction time was prolonged to 15 hours. At the end of polymerization, the reaction mixture gelled and the stirring stopped. At this time, 400 mL of toluene was added to dissolve the polypropene before precipitation into 3 L of acidic methanol. Yield: 8.22 g. GPC: $M_w$=2,020,000; $M_n$=830,000; PDI=2.43.

Example 4

Kinetics experiment of propene polymerization in chlorobenzene.

Figure 4:
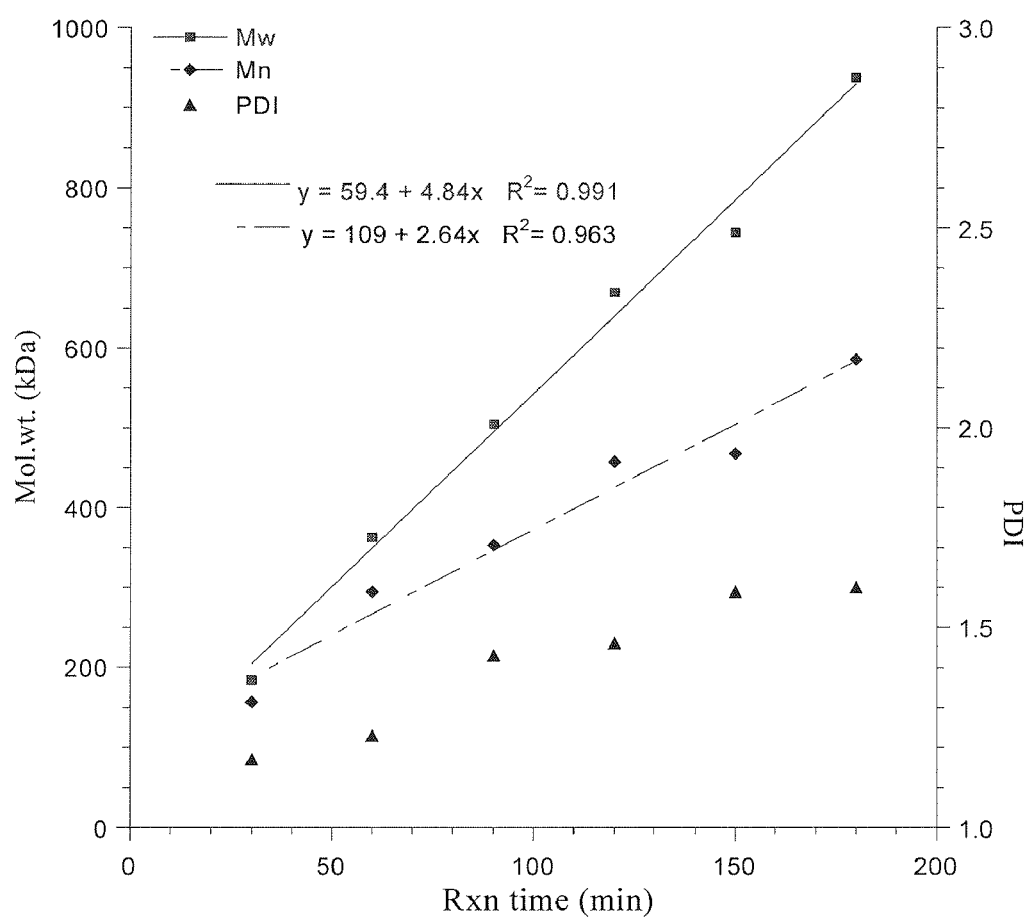
FIG. 4 is a graphic analysis of the kinetics of the polymerization of propene in chlorobenzene. Gel permeation chromatography results for aliquots removed every 30 minutes are presented.

The polymerization was conducted under conditions similar to Example 2 except aliquots were taken and quenched with methanol every 30 minutes over 3 hours. After the last aliquot was taken, polymerization was continued for a total of 6 hours during which time, stirring was significantly slowed after 2 hours due to increased viscosity and completely stopped by the end of the 6 hours. All the aliquots were purified by precipitation into acidic methanol and dried in vacuo. GPC results of the aliquots are presented in FIG. 4.

The final bulk reaction mixture was diluted with 100 mL of toluene before precipitation into 1.5 L of acidic methanol. GPC of the final product: $M_w$=1,470,000; $M_n$=712,000; PDI=2.06.

Example 5

Polymerization of propene in toluene

In a 250-mL Schlenk flask, to a solution of the co-catalyst 2 (8.0 mg, 10 μmol) in 9.0 mL of toluene at −10° C. was added 1 (4.6 mg, 10 μmol) in 1.0 mL toluene. The reaction flask was then pressurized to 5 psi with propene and the pressure was maintained for 30 min with stirring before being quenched with 0.5 mL of methanol. The reaction mixture was precipitated into 800 mL acidic methanol to isolate the polymer product. The final pure polypropene was collected and dried overnight in vacuo. Yield: 0.59 g. GPC: $M_w$=141,000; $M_n$=122,000; PDI=1.16.

Example 6

General procedure for living coordinative chain transfer polymerization (CCTP) of propene.

In a 250-mL Schlenk flask, to a solution of the co-catalyst 2 (16.0 mg, 20 μmol) in 19.7 mL toluene at 0° C. was added 1 (9.1 mg, 20 μmol) and (329 mg, 20 equiv.) $ZnEt_2$ as a 1.1 M (15% wt) solution in toluene. The flask was then pressurized to 5 psi with propene and the pressure was maintained for 2 hours with stirring before quenching with 1.0 mL of methanol. The toluene solution was precipitated into 600 mL of acidic methanol to isolate the polypropene. The final product was collected and dried overnight in vacuo. Details of the amount of reagents and polymerization times are provided in Table 1.

Figure 5:
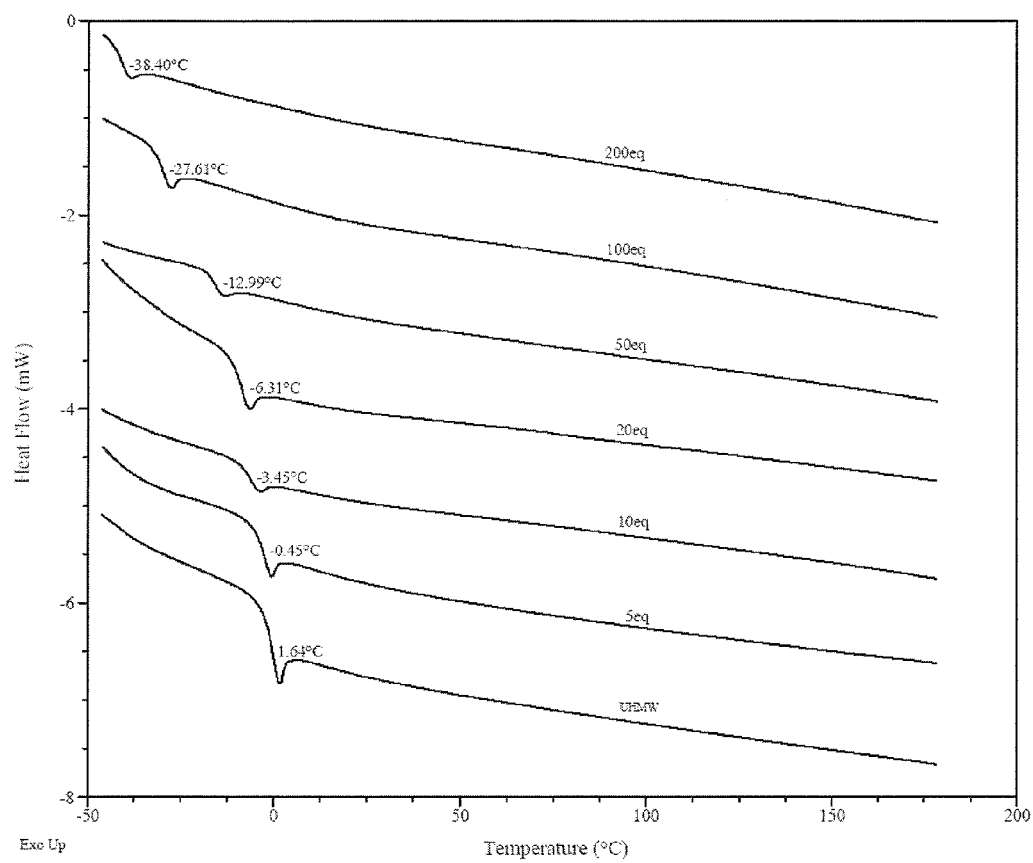
FIG. 5 is the differential scanning calorimetry analyses of amorphous atactic polypropene materials prepared in accordance with an embodiment of the present invention.

The results of differential scanning calorimetry (DSC) analyses for all the amorphous atactic polypropene materials prepared in Table 1 and a sample of the ultra-high molecular weight amorphous atactic polypropene are shown in FIG. 5. Note the conspicuous absence of any $T_m$.

TABLE 1

Coordinative Chain-Transfer Polymerization (CCTP) of Propene with 2 and added $ZnEt_2$.[a]

| Run | [1]$_0$, [2]$_0$ (μmol) | $ZnEt_2$ (equiv) | $T_p$ (° C.) | Yield (g) | $M_n$ (kDa) | $M_w/M_n$ |
|---|---|---|---|---|---|---|
| 1 | 20 | 20 | −10 | 6.02 | 12.6 | 1.03 |
| 2 | 20 | 20 | −20 | 7.92 | 15.9 | 1.03 |
| 3 | 20 | 20 | 20 | 1.63 | 3.63 | 1.05 |
| 4 | 20 | 200 | 0 | 4.99 | 1.45 | 1.08 |
| 5 | 20 | 100 | 0 | 4.93 | 2.28 | 1.06 |
| 6 | 20 | 50 | 0 | 4.94 | 4.18 | 1.04 |
| 7 | 20 | 20 | 0 | 4.18 | 8.75 | 1.04 |
| 8 | 20 | 10 | 0 | 4.78 | 18.7 | 1.04 |
| 9 | 20 | 5 | 0 | 4.85 | 33.3 | 1.09 |
| 10 | 10 | 10 | 0 | 10.1 | 71.9 | 1.09 |
| 11 | 10 | 5 | 0 | 9.64 | 111 | 1.15 |

[a]Conditions: $ZnEt_2$ added as 1.1 M solution in toluene, total volume (toluene) = 20 ml and $t_p$ = 2 h, except for runs 10 and 11 (50 ml, 14 h), at constant propene pressure (5 psi).

Figure 6:
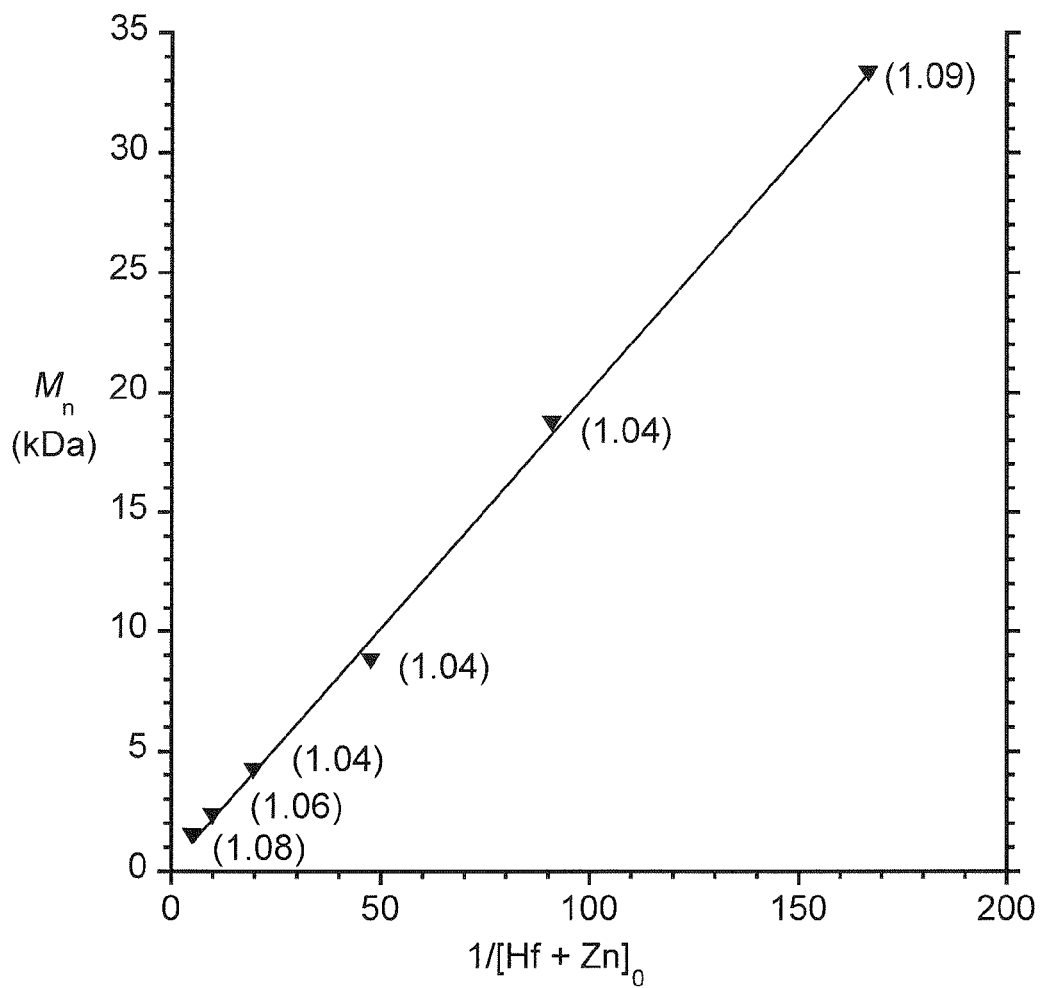
FIG. 6 shows dependence of observed $M_a$ and $M_n/M_w$ (in parentheses) as a function of the inverse of total initiator concentration of metal species prepared in accordance with an embodiment of the present invention.

FIG. 6 shows a plot of observed $M_n$ v 1/[Hf+Zn]$_0$. This plot reveals a strictly linear relationship, which is coupled with constant yield and extremely narrow polydispersities of all the isolated amorphous atactic polypropene products (Table 1). This provides strong evidence that highly efficient living CCTP is being maintained without affecting the overall activity, rate of chain transfer, or chain termination. The highly linear relationship between $M_n$ v time, as well as the narrow polydispersity index values confirm the linear nature of the polymerization process.

Figure 7:
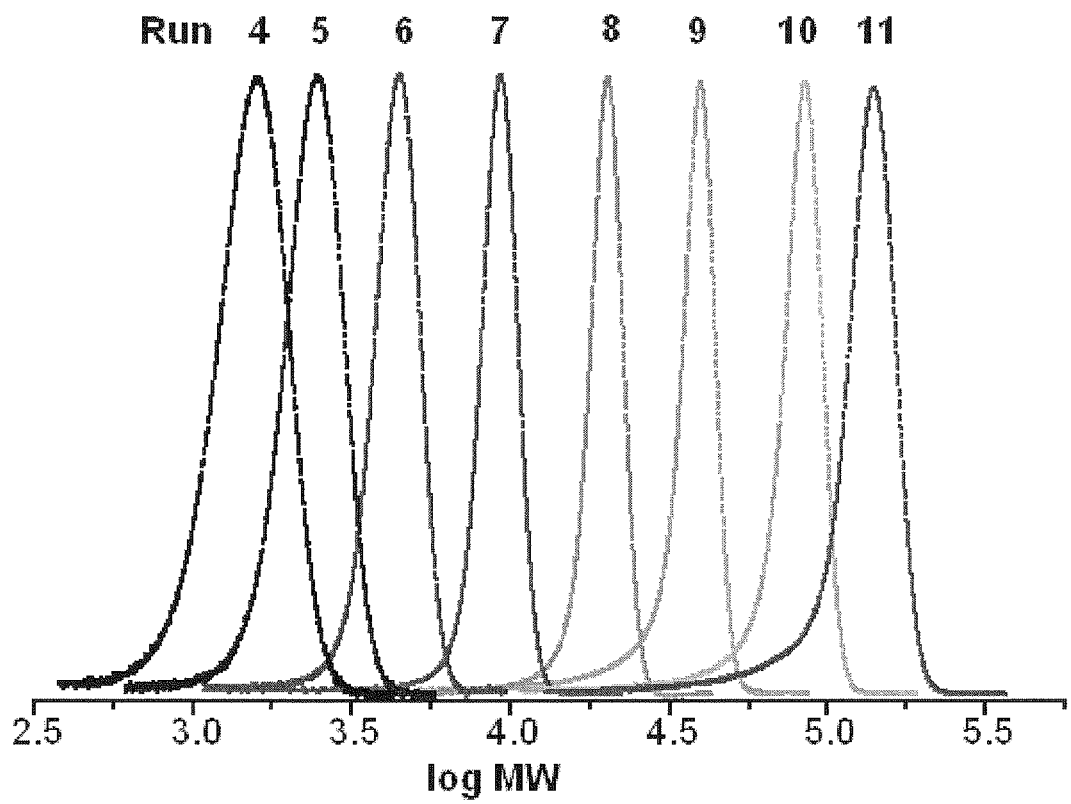
FIG. 7 shows molecular weight distributions for amorphous atactic polypropene samples prepared in accordance with an embodiment of the present invention.

FIG. 7 and Table 1 show that high $M_n$ values and large quantities of amorphous atactic polypropene can be obtained using the CCTP process. CCTP using 5 equivalents of ZnEt$_2$ gave a $M_n$ as high as 111 kDa (Run 11 of Table 1) with the polydispersity range remaining narrow with a $M_w/M_n$=1.15.

Example 7

Kinetics experiment of CCTP of propene.

Figure 8:
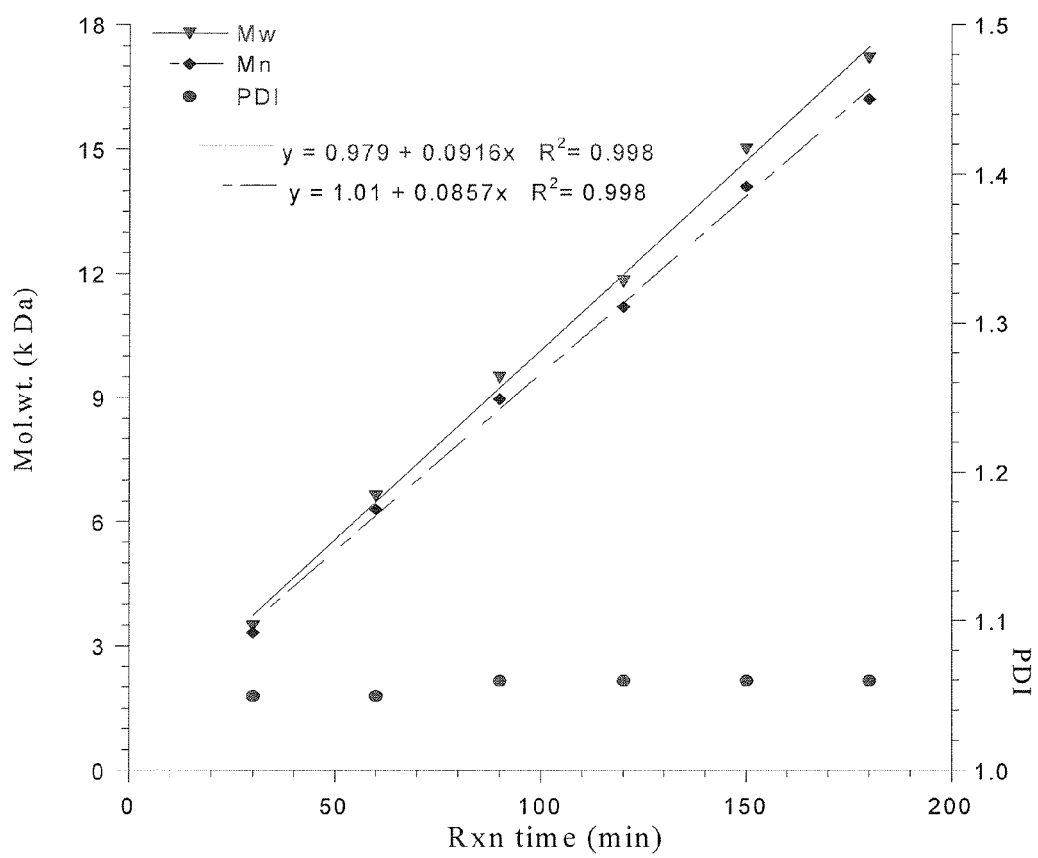
FIG. 8 is a graphic analysis of the kinetics of the coordinative chain transfer polymerization of propene in toluene. Gel permeation chromatography results for aliquots removed every 30 minutes are presented.

The kinetic study was conducted under conditions similar to Example 4. In a 250-mL Schlenk flask, to a solution of 2 (40.0 mg, 50 μmol) in 49.2 mL toluene at 0° C. was added 1 (22.8 mg, 50 μmol) and (820 mg, 20 equivalent) ZnEt$_2$ as a 1.1 M (15% wt) solution in toluene. The flask was then pressurized to 5 psi with propene and the pressure was maintained for 3 hours with stirring. Aliquots were taken every 30 minutes over 2.5 hours and quenched with methanol. The aliquots were also purified by precipitation into acidic methanol and dried in vacuo. The bulk of the reaction solution was then quenched with 1.5 mL of methanol after the end of 3 hours and precipitated into 800 mL of acidic methanol. The final product was collected and dried in vacuo. GPC results are presented in FIG. 8.

Example 8

General procedure for living coordinative chain transfer polymerization (CCTP) of ethene.

In a 250-mL Schlenk flask, to a toluene solution of the co-catalyst 2 at 25° C. was added the pre-catalyst 1 and ZnEt$_2$. The flask was then pressurized to slightly above 1 atm (~5 psi) with ethene and the pressure was maintained for a specific time with stirring before quenching with 0.5 mL of methanol. The toluene solution was precipitated into 600 mL of acidic methanol (10% concentrated HCl) to isolate the polymer. The final product was collected and dried overnight in vacuo before GPC and NMR analyses. Details of the amount of reagents and polymerization times are provided in Table 2.

Figure 2:
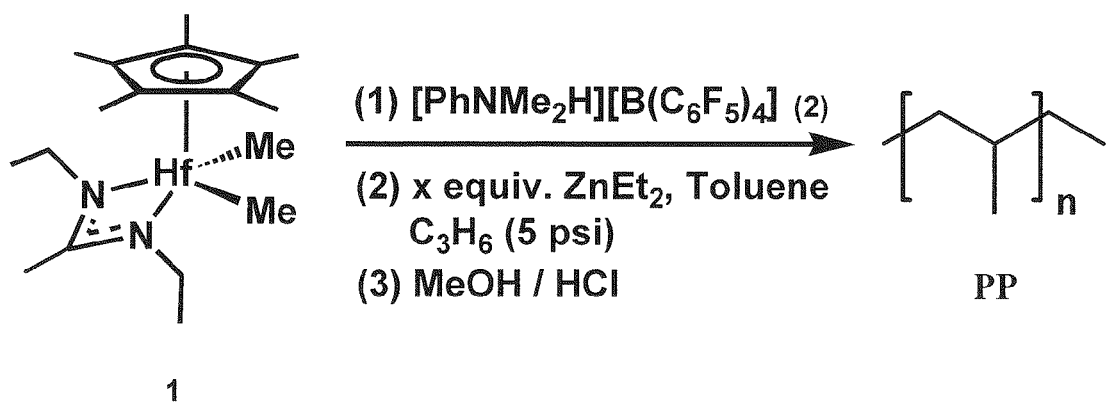
FIG. 2 is a graphic illustration of the living coordinative chain transfer polymerization of propene.

In the absence of a main group metal alkyl, introduction of ethene at ~5 psi into a toluene solution of the cationic complex 1a, prepared in situ according to FIG. 2, resulted in rapid precipitation of polyethene at 25° C. In order to attenuate polymerization activity, an equimolar amount of the borane co-catalyst, B(C$_6$F$_5$)$_3$, was used to generate [{Cp*HfMe[N(Et)C(Me)N(Et)]}[B(C$_6$F$_5$)$_3$Me] (1b) from the pre-catalyst 1 through methide group abstraction (see FIG. 1).

TABLE 2

Living CCTP of ethene using 1b and ZnR$_2$$^a$.

| Run | ZnEt$_2$ (eq) | $t_p$ (min)$^b$ | Yield (g) | $M_n$ (Da)$^c$ | D$^d$ | $T_m$ (° C.)$^e$ |
|---|---|---|---|---|---|---|
| 1 | 20 | 8 | 0.21 | 665 | 1.03 | 80 |
| 2 | 50 | 18 | 0.34 | 527 | 1.07 | 67 |
| 3 | 100 | 32 | 0.72 | 526 | 1.06 | 66 |
| 4 | 150 | 48 | 0.92 | 499 | 1.07 | 63 |
| 5 | 200 | 63 | 1.17 | 466 | 1.07 | 61 |
| 6$^f$ | 50 | 21 | 0.24 | 449 | 1.06 | 56 |

$^a$Conditions: 2 (10 μmol), 1 (10 μmol) and ZnR$_2$ in toluene (40 ml) at 25° C. under positive pressure of ethene (~5 psi).
$^b$Polymerizations were terminated at onset of precipitation.
$^c$Determined by $^1$H (600 MHz) and $^{13}$C (150 MHz) NMR end-group analysis.
$^d$Determined by GPC analysis.
$^e$Determined by DSC analysis.
$^f$Zn(iso-propyl)$_2$ was used in place of ZnEt$_2$.

Figure 9:
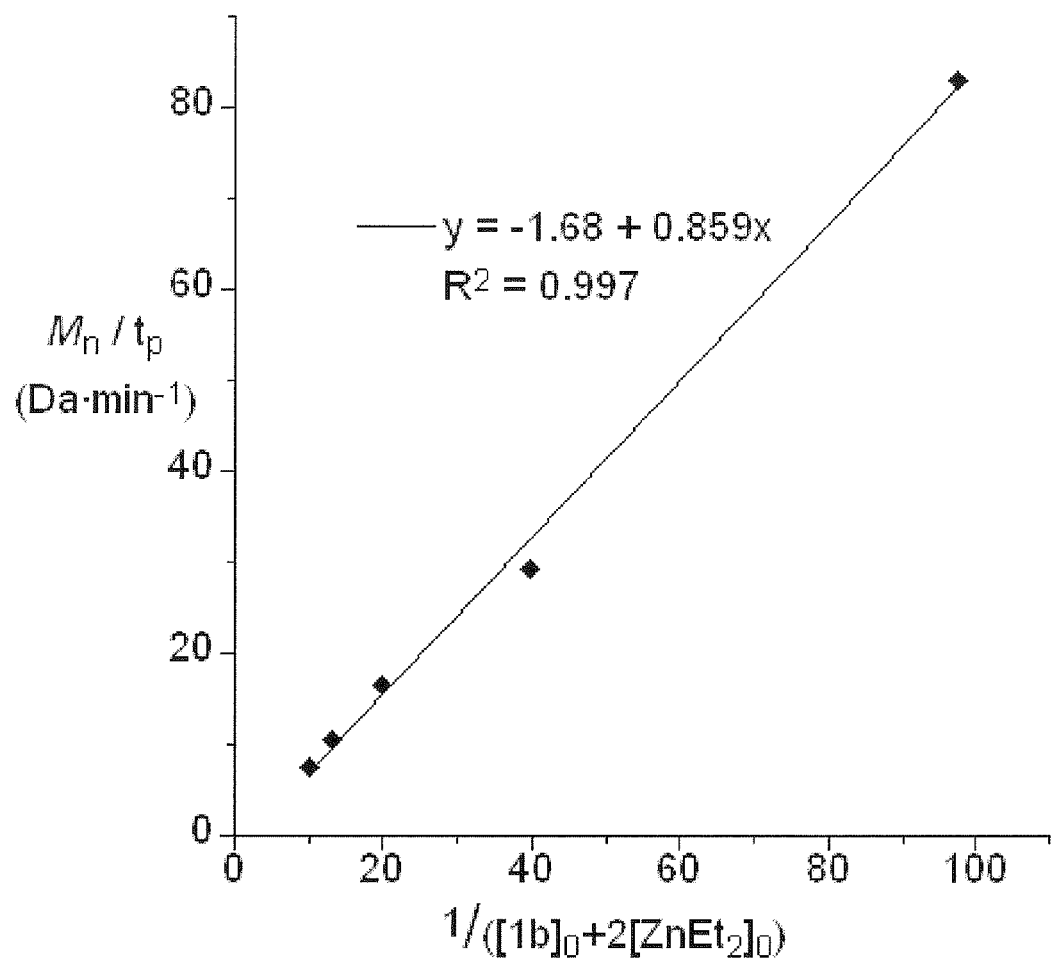
FIG. 9 is a graphic analysis of the dependence of time-normalized $M_n$ values as a function of total active and surrogate metal sites for chain-growth in accordance with an embodiment of the present invention.

As shown in Table 2 and FIG. 9, this modification led to successful development of highly efficient living CCTP of ethene that can be conducted in the presence of varying molar equivalents of ZnEt$_2$ and Zn(iso-propyl)$_2$. In the presence of 20 equiv of ZnEt$_2$, polymerization of ethene according to run 1 of Table 2 showed no precipitation of material until a polymerization time, $t_p$, of 8 min, and with more equivalents of ZnEt$_2$, this window of solution homogeneity could be extended even longer without affecting CCTP activity (see runs 1-5 of Table 2). CCTP of ethene using Zn(iso-propyl)$_2$ appeared to proceed with only a slightly lower activity under identical conditions (see runs 2 and 6 of Table 2). $^1$H and $^{13}$C NMR spectroscopy were used to quantify the nature of the end-groups and $M_n$ values after standard work-up and isolation of the polyethene products, and the $^{13}$C NMR spectra for runs 5 and 6 revealed highly linear polyethene structures with well-defined end-groups, the latter showing no evidence for chain-termination by β-hydrogen transfer.

Figure 10:
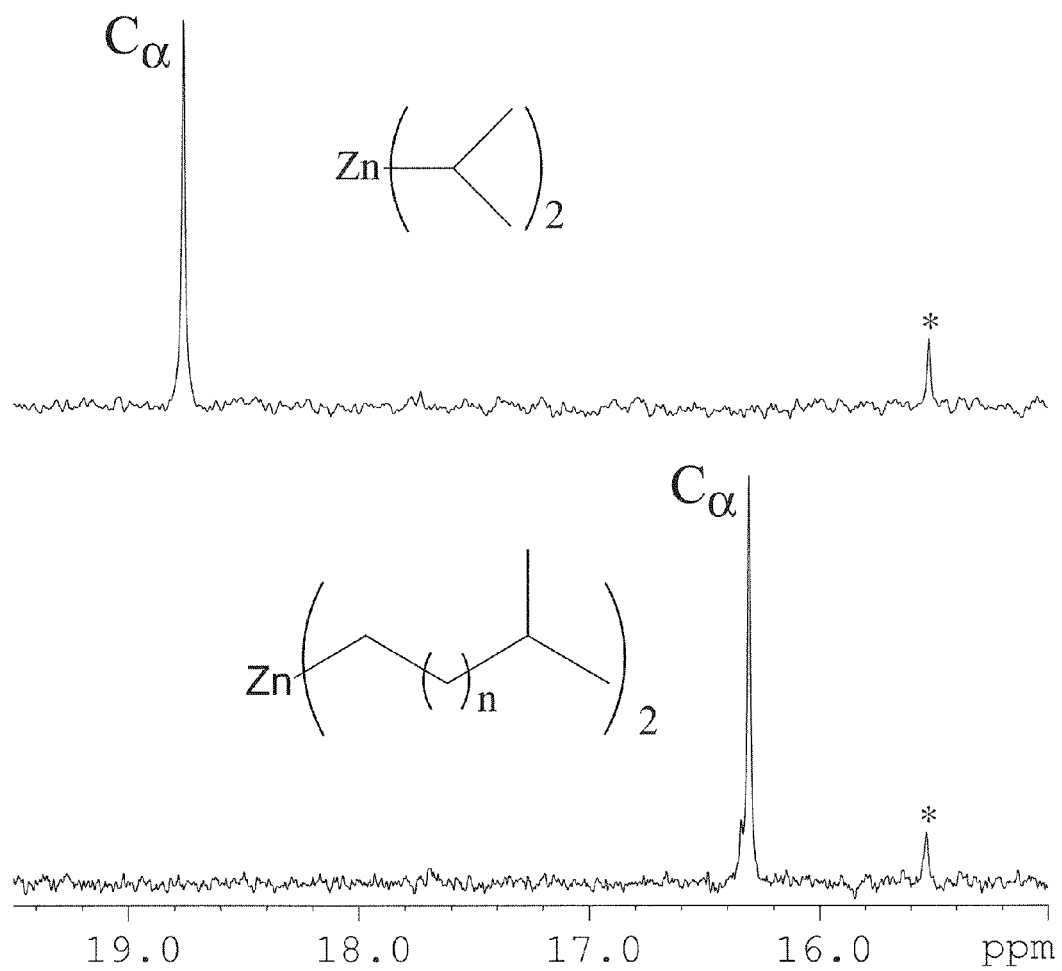
FIG. 10 is a partial $^{13}C$ {$^1H$} NMR spectra showing the Zn—$C_\alpha$ region (top) of a mixture of 1b and Zn(iso-propyl)$_2$ in the absence of ethene and within 15 minutes after the introduction of ethene (bottom).

This data also revealed that the polyethene material obtained from CCTP using 50 equiv of Zn(iso-propyl)$_2$ distinctly possesses one iso-propyl end group and one non-branched end group. The $^{13}$C NMR spectra presented in FIG. 10 for an NMR-scale CCTP polymerization of ethene verifies that both of the iso-propyl groups in Zn(iso-propyl)$_2$ rapidly engage in chain-growth of polyethene via the mechanism of FIG. 1. FIG. 9 also shows that the $t_p$-normalized $M_n$ values for the isolated polyethene materials from runs 1-5 are proportional to $1/\{[1b]_o+2[ZnEt_2]_o\}$ as expected for non-terminating CCTP according to FIG. 1. In practical terms, for run 5 of Table 2, only 4.6 mg of pre-catalyst 1 was required to prepare 1.17 g of polyethene with $M_n$ of 466 Da (D=1.07) under CCTP using 200 equiv of ZnEt$_2$, whereas 1.15 g of 1 would have been necessary to provide the same amount of product through standard living coordination polymerization.

Example 9

General procedure for living CCTP of higher α-olefins and 1,5-hexadiene.

In a 100-mL Schlenk flask, to a toluene solution of the co-catalyst 2 at a desired temperature was added the pre-catalyst 1, ZnEt$_2$ and the liquid monomer. The reaction mixture was stirred for a specific time before quenching with 0.5 mL of methanol. The toluene solution was precipitated into 600 mL of acidic methanol (10% concentrated HCl) to isolate the polymer. The final product was collected and dried overnight in vacuo before GPC and NMR analyses. Details of the amount of reagents, reaction temperatures, and polymerization times are provided in Table 3.

TABLE 3

Living CCTP of higher α-olefins and 1,5-hexadiene (HD) using 1a and ZnEt$_2$$^a$.

| Run | ZnEt$_2$(equiv) | Monomer (equiv) | $t_p$ (h) | Yield (g) | $M_n$ (kDa) | D |
|---|---|---|---|---|---|---|
| 1 | 10 | 1-hexene (1670) | 15 | 1.06 | 6.65 | 1.06 |
| 2 | 20 | 1-hexene (1670) | 15 | 1.08 | 3.83 | 1.05 |
| 3 | 20 | 1-octene (1000) | 18 | 0.82 | 3.33 | 1.06 |
| 4$^b$ | 10 | 1,5-HD (1400) | 15 | 0.77 | 8.02 | 1.04 |

$^a$Conditions: 1 (10 μmol), 2 (10 μmol) and ZnEt$_2$ in toluene (10 ml) at −10° C.
$^b$Polymerization performed at 0° C.

Figure 11:
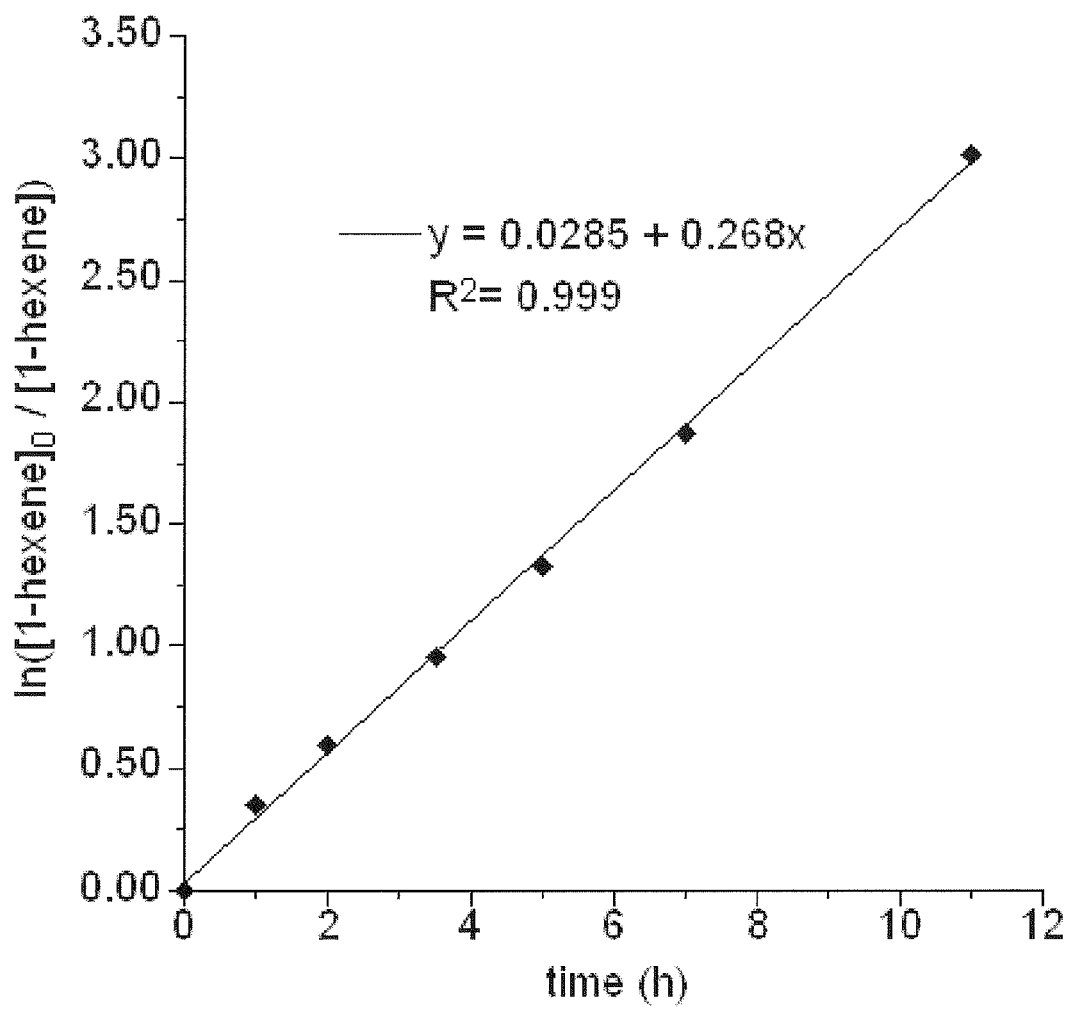
FIG. 11 is a graphical analysis of the kinetics of the living coordinative chain transfer polymerization of 1-hexene with ZnEt$_2$.

FIG. 11 presents a kinetic analysis for CCTP of 1-hexene with ZnEt$_2$ that displays a linear relationship between monomer conversion and time, and this correlation, along with end-group analysis by NMR spectroscopy, unequivocally establish the living character of polymerization which represents CCTP for a higher α-olefin other than propene. The data of Table 3 further reveal that the living CCTP of 1-octene and 1,5-hexadiene (HD) can also be accomplished in similar fashion (runs 3 and 4). For the latter, structural analysis by $^{13}C$ NMR spectroscopy reveals that propagation proceeds almost exclusively by living cyclopolymerization to provide cis, trans-poly(methylene-1,3-cyclopentane) (PMCP) with less than 0.5% of propagation occurring via non-cyclized insertion of the 1,5-HD monomer that leaves pendant vinyl groups.

Example 10

General procedure for living CCTP random copolymerization of ethene and higher α-olefins or 1,5-hexadiene.

In a 250-mL Schlenk flask, to a toluene solution of the co-catalyst 2 at 25° C. were added the pre-catalyst 1 and ZnEt$_2$, and the liquid monomer. The flask was then pressurized to slightly above 1 atm (~5 psi) with ethene and the pressure was maintained for a specific time with stirring before quenching with 0.5 mL of methanol. The toluene solution was precipitated into 600 mL of acidic methanol (10% concentrated HCl) to isolate the polymer. The final product was collected and dried overnight in vacuo before GPC and NMR analyses. Details of the amount of reagents and polymerization times are provided in Table 4.

The data in Table 4 for copolymerizations of ethene with 1-hexene (runs 1 and 2) and with 1,5-HD (runs 6 and 7) confirm that, under identical conditions, $M_n$ values for the isolated copolymers are directly dependent on the molar equivalents of ZnEt$_2$ that are employed and with product yields once again remaining invariant. Gel permeation chromatography (GPC) of the copolymer products further revealed monomodal molecular weight distributions possessing slightly broader polydispersities which may be indicative of slower reversible chain-transfer relative to propagation.

TABLE 4

Living coordinative chain transfer random copolymerization of ethene with higher α-olefins and 1,5-HD.[a]

| Run | ZnEt$_2$ (equiv) | Co-monomer (equiv) | $t_p$ (min) | Yield (g) | % PE[b] | $M_n$ (kDa) | Đ |
|---|---|---|---|---|---|---|---|
| 1 | 20 | 1-hexene (1500) | 60 | 2.79 | 84 | 13.0 | 1.16 |
| 2 | 50 | 1-hexene (1500) | 60 | 2.56 | 82 | 5.91 | 1.24 |
| 3 | 20 | 1-octene (1500) | 60 | 2.47 | 80 | 10.4 | 1.14 |
| 4[c] | 20 | 1-octene (1000) | 60 | 2.60 | 88 | 12.1 | 1.15 |
| 5 | 20 | 1-octene (1000) | 30 | 1.60 | 91 | 8.87 | 1.25 |
| 6 | 20 | 1,5-HD (1500) | 60 | 2.45 | 85 | 14.8 | 1.06 |
| 7 | 50 | 1,5-HD (1500) | 60 | 2.34 | 84 | 6.22 | 1.11 |

[a]Conditions: 1 (10 μmol), 2 (10 μmol) and ZnEt$_2$ in toluene (40 ml) at 25° C. and ethene (~5 psi).
[b]Polyethene (PE) content determined by NMR.
[c]25 ml of toluene used.

Figure 12:
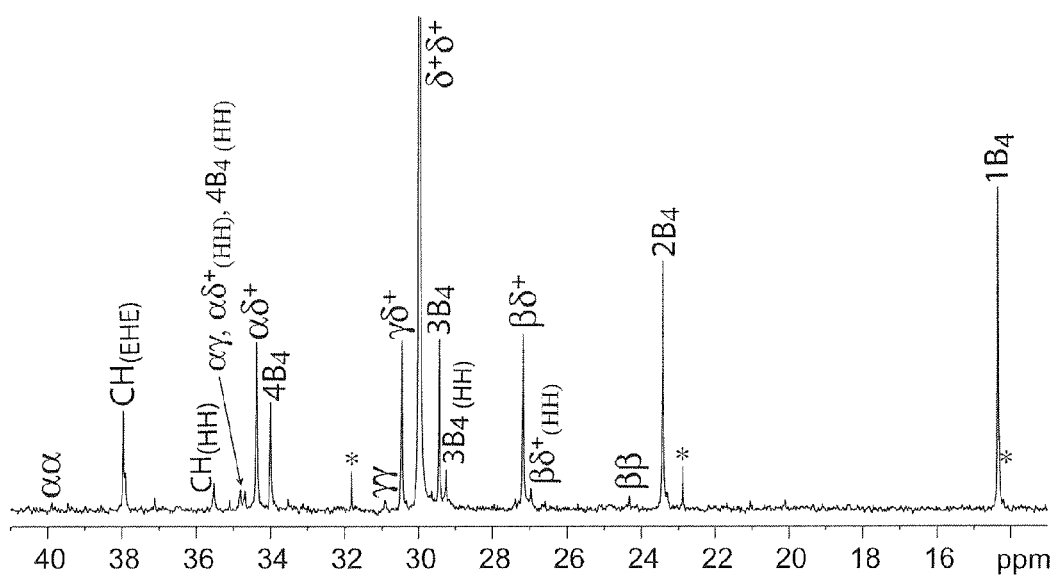
FIG. 12 is the $^{13}C$ NMR spectrum for poly(ethene-co-1-hexene) prepared in accordance with an embodiment of the present invention.
Figure 13:
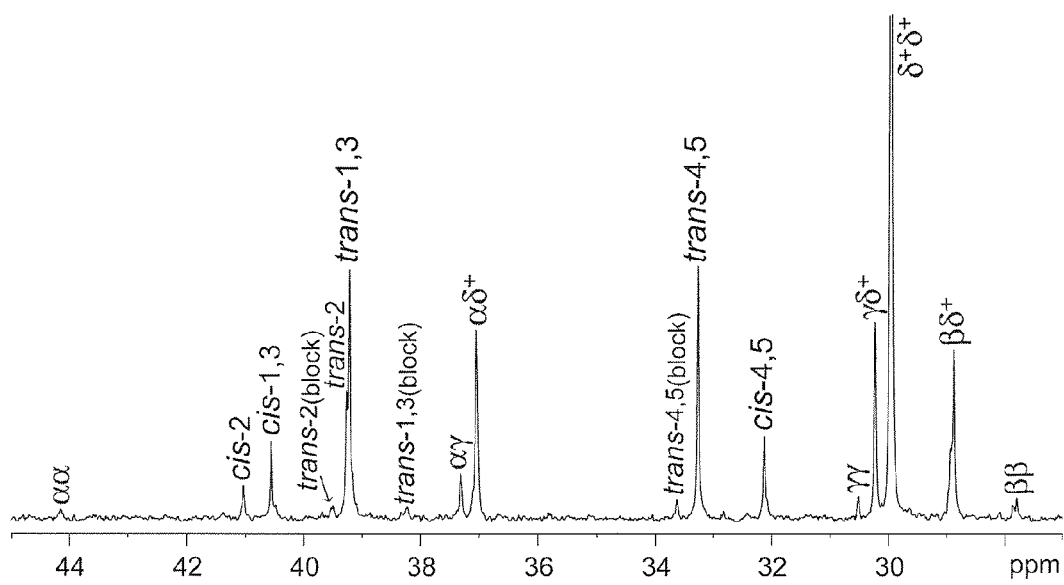
FIG. 13 is the $^{13}C$ NMR spectrum for poly(ethene-co-cis-poly(methylene-1,3-cyclopentane)) prepared in accordance with an embodiment of the present invention.
Figure 14:
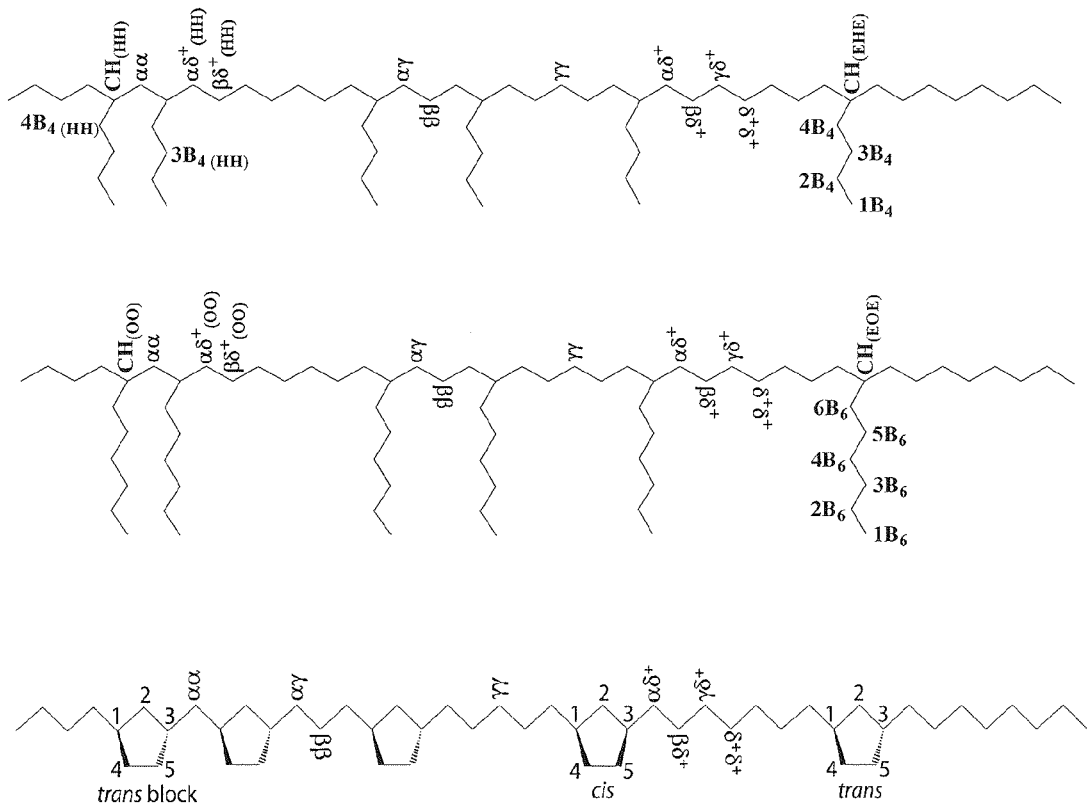
FIG. 14 shows illustrative structures and resonance assignments of poly(ethene-co-1-hexene), poly(ethene-co-1-octene) and poly(ethene-co-cis-poly(methylene-1,3-cyclopentane)) prepared in accordance with embodiments of the present invention.

FIGS. 12 and 13 present structural analyses of the copolymers by $^{13}C\{^1H\}$ NMR (150 MHz) spectroscopy, and, in each case, the co-monomer is almost exclusively incorporated into the polymer backbone as isolated units and with only a trace of either consecutive co-monomer dyads (e.g. H-H or HD-HD) or alternating co-monomer triads (e.g., H-E-H or HD-E-HD) being observed. Incorporation of 1,5-HD occurs exclusively by cyclopolymerization to produce isolated methylene-1,3-cyclopentane units. DSC analyses of all the copolymers of Table 4 revealed phase transitions that are distinct from those expected for each of the possible homopolymers. Indeed, each of the poly(ethene-co-PMCP) materials are characterized by well-defined $M_n$-dependent, first-order melting transitions (see $T_m$=87 and 76° C. for runs 6 and 7, respectively).

From the foregoing description, one skilled in the art can easily ascertain the essential characteristics of this invention, and without departing from the spirit and scope thereof, can make various changes and modifications of the invention to adapt it to various usages and conditions without undue experimentation. All patents, patent applications and publications cited herein are incorporated by reference in their entirety.

What is claimed is:

1. A method of producing a polyolefin composition comprising contacting a metallocene pre-catalyst, a co-catalyst, and a stoichiometric excess of a metal alkyl; adding a first olefin monomer; and polymerizing by living coordinative chain transfer said first monomer for a time sufficient to form said polyolefin.

2. The method of claim 1, wherein said metallocene pre-catalyst is $\eta^5$-C$_5$Me$_5$*Hf(Me)$_2$[N(Et)C(Me)N(Et)].

3. The method of claim 1, wherein said co-catalyst is [PhNMe$_2$H][B(C$_6$F$_5$)$_4$], [PhNMe$_2$H][B(C$_6$F$_5$)$_3$Me] or B(C$_6$F$_5$)$_3$.

4. The method of claim 1, wherein said metal alkyl consists of a mixture of two different metal alkyls.

5. The method of claim 4, wherein said mixture of metal alkyls consists of a 1:1 mixture of AlEt$_3$ and ZnEt$_2$.

6. The method of claim 1, wherein said metal alkyl is ZnEt$_2$ or Zn(iso-propyl)$_2$.

7. The method of claim 1, wherein said metallocene pre-catalyst and said co-catalyst are contacted in a metallocene pre-catalyst:co-catalyst ratio of about 1:1.

8. The method of claim 1, wherein said metal alkyl and metallocene pre-catalyst are added in a metal alkyl:metallocene pre-catalyst ratio of about 5000:1-1.1:1.

9. The method of claim 8, wherein said ratio is 5:1 to 200:1.

10. The method of claim 8, wherein said ratio is 50:1.

11. The method of claim 8, wherein said ratio is 20:1.

12. The method of claim 8, wherein said ratio is 10:1.

13. The method of claim 1, wherein said metal alkyl is contacted with said metallocene pre-catalyst and said co-catalyst in an inert solvent.

14. The method of claim 13, wherein said solvent is toluene.

15. The method of claim 1, wherein said metal alkyl, said metallocene pre-catalyst, and said co-catalyst are contacted at a temperature of about −20° C. to about 25° C.

16. The method of claim 1, wherein said first olefin monomer is ethene, propene, 1-butene, 1-pentene, 1-hexene, 1-heptene, 1-octene, styrene, alpha-methyl styrene, butadiene, isoprene, acrylonitrile, methyl acrylate, methyl methacrylate, vinyl acetate, vinyl chloride, vinyl fluoride, vinylidene chloride, N-vinyl pyrrolidone, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene, cyclopentene, vinylcyclohexene or 4-methyl-1-pentene.

17. The method of claim 1, wherein said first olefin monomer is a non-conjugated diene having the formula:

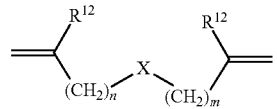

wherein X=CH$_2$, CO, N(R$^{13}$), O or S;
R$^{11}$, R$^{12}$ and R$^{13}$ are each indepedently H, alkyl or phenyl; and n and m are each independently an integer from 0-5.

18. The method of claim 1, wherein said first olefin monomer is ethene, propene, 1-hexene, 1-octene, or 1,5-hexadiene.

19. The method of claim 1, wherein said polyolefin is an atactic polyolefin having a polydispersity index of about 1.03-1.15.

20. The method of claim 1, further comprising adding a second olefin monomer; and polymerizing said second monomer for a time sufficient to form said polyolefin.

21. The method of claim 20, wherein said second olefin monomer is ethene, propene, 1-butene, 1-pentene, 1-hexene, 1-heptene, 1-octene, styrene, alpha-methyl styrene, butadiene, isoprene, acrylonitrile, methyl acrylate, methyl methacrylate, vinyl acetate, vinyl chloride, vinyl fluoride, vinylidene chloride, N-vinyl pyrrolidone, 3-methylbutene, 3-methyl-1-pentene, vinylcyclohexane, vinylcyclobutane, vinylcyclopentane, vinylcyclooctane, 1-decene, enantiomerically pure β-citronellene, 3,5,5-trimethyl-1-hexene or 4-methyl-1-pentene.

22. The method of claim 20, wherein said second olefin monomer is a non-conjugated diene having the formula:

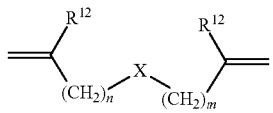

wherein X=$CH_2$, CO, N($R^{13}$), O or S;
$R^{11}$, $R^{12}$ and $R^{13}$ are each independently H, alkyl or phenyl; and
n and m are each independently an integer from 0-5.

23. The method of claim 20, wherein said polyolefin is an atactic living polyolefin.

24. The method of claim 20, wherein said block-polyolefin composition comprises a diblock copolymer having the formula: atactic-poly(first olefin)-co-poly(second olefin).

25. The method of claim 20, wherein said diblock copolymer composition has a polydispersity index of about 1.02-1.2.

26. The method of claim 20, wherein said diblock copolymer is monomodal.

27. A method of producing a polyolefin composition comprising contacting $\eta^5$-$C_5Me_5$*Hf(Me)$_2$[N(Et)C(Me)N(Et)], [PhNMe$_2$H][B($C_6F_5$)$_4$], and a stoichiometric excess of ZnEt$_2$; adding a first olefin monomer; and polymerizing said first monomer by living coordinative chain transfer for a time sufficient to form said polyolefin.

28. The method of claim 27, wherein the first olefin monomer is propene.

29. The method of claim 27, wherein the first olefin monomer is ethene.

30. The method of claim 27, wherein said $\eta^5$-$C_5Me_5$*Hf(Me)$_2$[N(Et)C(Me)N(Et)] and said ZnEt$_2$ are contacted in a ratio of 5:1 to 200:1.

31. A method of producing a polyolefin composition comprising contacting $\eta^5$-$C_5Me_5$*Hf(Me)$_2$[N(Et)C(Me)N(Et)], [PhNMe$_2$H][B($C_6F_5$)$_4$], and a stoichiometric excess of ZnEt$_2$; adding a first olefin monomer; adding a second olefin monomer; and polymerizing said monomers by living coordinative chain transfer for a time sufficient to form said polyolefin.

32. The method of claim 31, wherein the first olefin monomer is ethene, propene, 1-butene, 1-pentene, 1-hexene, 1-heptene, 1-octene, styrene, alpha-methyl styrene, butadiene, isoprene, acrylonitrile, methyl acrylate, methyl methacrylate, vinyl acetate, vinyl chloride, vinyl fluoride, vinylidene chloride, N-vinyl pyrrolidone, 3-methylbutene, 3-methyl-1-pentene, vinylcyclohexene, vinylcyclobutane, vinylcyclopentane, vinylcyclooctane, 1-decene, enantiomerically pure (3-citronellene, 3,5,5-trimethyl-1-hexene, cyclopentene, vinylcyclohexene, 4-methyl-1-pentene or a non-conjugated diene having the formula:

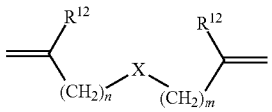

wherein X=$CH_2$, CO, N($R^{13}$), O or S;
$R^{11}$, $R^{12}$ and $R^{13}$ are each indepedently H, alkyl or phenyl; and
n and m are each independently an integer from 0-5;
and the second olefin monomer is 1-hexene, 1-octene or 1,5-hexadiene.

33. The method of claim 31, wherein the first olefin monomer is ethene and the second olefin monomer is 1-hexene, 1-octene or 1,5-hexadiene.

* * * * *